United States Patent
Cruz-Uribe et al.

(10) Patent No.: US 10,710,362 B2
(45) Date of Patent: Jul. 14, 2020

(54) DROPLET DEPOSITION HEAD AND METHOD OF PROVIDING ADJUSTMENT DATA THEREFOR

(71) Applicant: Xaar Technology Limited, Cambridge (GB)

(72) Inventors: Tony Cruz-Uribe, Cambridge (GB); Subramanian Sivaramakrishan, Cambridge (GB); Raymond Paul Marko Dorrestijn, Cambridge (GB)

(73) Assignee: XAAR TECHNOLOGY LIMITED, Cambridge (GB)

( * ) Notice: Subject to any disclaimer, the term of this patent is extended or adjusted under 35 U.S.C. 154(b) by 6 days.

(21) Appl. No.: 16/314,366

(22) PCT Filed: Jun. 30, 2017

(86) PCT No.: PCT/GB2017/051929
§ 371 (c)(1),
(2) Date: Dec. 28, 2018

(87) PCT Pub. No.: WO2018/002651
PCT Pub. Date: Jan. 4, 2018

(65) Prior Publication Data
US 2019/0152222 A1  May 23, 2019

(30) Foreign Application Priority Data
Jun. 30, 2016  (GB) .................... 1611509.9

(51) Int. Cl.
*B41J 2/045* (2006.01)
*B33Y 50/02* (2015.01)
*B29C 64/393* (2017.01)

(52) U.S. Cl.
CPC ......... *B41J 2/04561* (2013.01); *B29C 64/393* (2017.08); *B33Y 50/02* (2014.12);
(Continued)

(58) Field of Classification Search
CPC .................. B41J 2/04561; B41J 2/04593; B41J 2/04591; B41J 2/0459; B41J 2/04581;
(Continued)

(56) References Cited

U.S. PATENT DOCUMENTS 7,614,719 B2 * 11/2009 Iriguchi ............... B41J 2/04581
347/10
2005/0104921 A1  5/2005 Watanabe
(Continued)

FOREIGN PATENT DOCUMENTS

JP  2007216576 A  8/2007

OTHER PUBLICATIONS

International Search Report and Written Opinion dated Oct. 25, 2017, in International Application No. PCT/GB2017/051929 (9 pages.).

*Primary Examiner* — Bradley W Thies
(74) *Attorney, Agent, or Firm* — Finnegan, Henderson, Farabow, Garrett & Dunner

(57) ABSTRACT

Disclosed is a method of providing adjustment data for a droplet deposition head (such as a printhead), or a data processing component therefor. The method makes use of test data, which has been collected by operating the droplet deposition head (or a test droplet deposition head of substantially the same construction, e.g from the same batch), using a set of test waveforms, at a number of frequencies within a test range, and by recording the volume and velocity of the thus-ejected droplets, with these recorded values (vol$_r$, vel$_r$) being represented within the test data. Each of the set of test waveforms includes a basic drive waveform and a number of adjusted drive waveforms, each of which corresponds to the basic drive waveform, but with a particular waveform parameter adjusted by a correspond- (Continued)

ing amount. This waveform parameter is a continuous variable, such as pulse width or pulse amplitude. The method further includes, determining adjustment values corresponding to a number of adjustment frequencies, each adjustment value corresponding to an amount of adjustment for the waveform parameter that, based on the test data, is expected to result in adjusted values for droplet volume and velocity of, respectively, $vol_a$ and $vel_a$, which are substantially equal to targeted values for droplet volume and velocity, $vol_T$ and $vel_T$. The method outputs adjustment data representing such adjustment values and their associated adjustment frequencies, for example in the form of values for a look-up-table. Also disclosed is a droplet deposition apparatus that includes a droplet deposition head with data storage having stored thereon a set of adjustment data. The head uses the adjustment data to actuate its actuator elements with a drive waveform that is based on a basic drive waveform, but with a particular waveform parameter being adjusted by an adjustment value, which is represented by the set of adjustment data and which is determined based on it being associated with the current operating frequency of the actuator element in question. The waveform parameter is again a continuous variable. The adjustment data enable the head to eject droplets at frequencies within an operating range for the head whose values for droplet volume and velocity are substantially equal to targeted values for droplet volume and velocity, $vol_T$ and $vel_T$.

22 Claims, 20 Drawing Sheets

(52) U.S. Cl.
CPC ......... *B41J 2/0459* (2013.01); *B41J 2/04581* (2013.01); *B41J 2/04588* (2013.01); *B41J 2/04591* (2013.01); *B41J 2/04593* (2013.01)

(58) Field of Classification Search
CPC .................... B41J 2/04588; B41J 2/04506; B41J 2/04535; B41J 2/04536; B41J 29/393; B33Y 50/02; B29C 64/393
See application file for complete search history.

(56) References Cited

U.S. PATENT DOCUMENTS

| | | |
|---|---|---|
| 2005/0200639 A1 | 9/2005 | Kobayashi |
| 2006/0279602 A1 | 12/2006 | Dijksman et al. |
| 2014/0210884 A1 | 7/2014 | Rosario et al. |

* cited by examiner

DROPLET DEPOSITION HEAD AND METHOD OF PROVIDING ADJUSTMENT DATA THEREFOR

This application is a National Stage Entry of International Application No. PCT/GB2017/051929, filed Jun. 30, 2017, which is based on and claims the benefit of foreign priority under 35 U.S.C. § 119 to GB Application No. 1611509.9, filed Jun. 30, 2016. The entire contents of the above-referenced applications are expressly incorporated herein by reference.

The present invention relates to droplet deposition heads and related methods. It may find particularly beneficial application in a printhead, such as an inkjet printhead.

Droplet deposition heads are now in widespread usage, whether in more traditional applications, such as inkjet printing, or in 3D printing, or other materials deposition or rapid prototyping techniques. Accordingly, the fluids may have novel chemical properties to adhere to new substrates and increase the functionality of the deposited material.

Recently, inkjet printheads have been developed that are capable of depositing ink directly onto ceramic tiles, with high reliability and throughput. This allows the patterns on the tiles to be customized to a customer's exact specifications, as well as reducing the need for a full range of tiles to be kept in stock.

In other applications, inkjet printheads have been developed that are capable of depositing ink directly on to textiles. As with ceramics applications, this may allow the patterns on the textiles to be customized to a customer's exact specifications, as well as reducing the need for a full range of printed textiles to be kept in stock.

In still other applications, droplet deposition heads may be used to form elements such as colour filters in LCD or OLED elements displays used in flat-screen television manufacturing.

So as to be suitable for new and/or increasingly challenging deposition applications, droplet deposition heads continue to evolve and specialise. However, while a great many developments have been made, there remains room for improvements in the field of droplet deposition heads.

SUMMARY

Aspects of the invention are set out in the appended claims.

BRIEF DESCRIPTION OF THE DRAWINGS

Reference is now directed to the drawings, in which.

DETAILED DESCRIPTION OF THE DRAWINGS

The following disclosure relates to the adjustment, using adjustment data, of droplet deposition heads.

Non-Uniformity of Droplets Ejected by a Head

An issue in certain droplet deposition heads is that the ejected droplets may be non-uniform, for example in terms of their volume and/or the velocity.

Many factors may introduce non-uniformity in the volume and/or the velocity of the droplets ejected by a droplet deposition head. One example is manufacturing variability: small changes in the dimensions of the fluidic passageways and the actuator elements supplying the pressure impulse may lead the volume and/or velocity of ejected droplets to noticeably depart from their nominal values; there may also be variation in the materials of the actuator elements. Further examples are the operation history and the environment of the droplet deposition head: properties of the actuator materials such as thermal or piezoelectric response may vary over time depending on usage, stress/strain, and temperature.

To address such non-uniformity of droplet volume and/or velocity, suitable alteration of the drive waveforms may be applied to the actuator elements of the droplet deposition head (the electrical waveforms that generate pressure within the fluid chambers of the head).

More particularly, non-uniformity of droplet volume and/or velocity may be addressed by adjusting the drive waveform according to "static" approaches, "dynamic" approaches, or a combination of both.

In dynamic approaches, the drive waveform is altered during use in dependence upon changes in the current state of the droplet deposition head, which may for instance result from the operation history of the head (such as the recent ejection history of each actuator element, as well as, potentially, that of its nearest neighbours) and/or the environment of the head. Thus, dynamic approaches may take into account the input data sent to the head, estimating the resulting changes in the state of the head and attempting to compensate for such changes accordingly. Dynamic approaches may also (or instead) take into account direct measurements of the state of the head, such as temperature measurements of the head as a whole, or a number of portions of the head.

By contrast, in static approaches the alteration of the drive waveform has no such dependence upon changes in the current state of the droplet deposition head. Thus, the corresponding adjustments will typically not vary with respect to time.

The following disclosure relates generally to such dynamic approaches. In practice however dynamic and static approaches can often be combined within the same head.

Frequency Response Curves and Dynamic Adjustment

Figure 1:
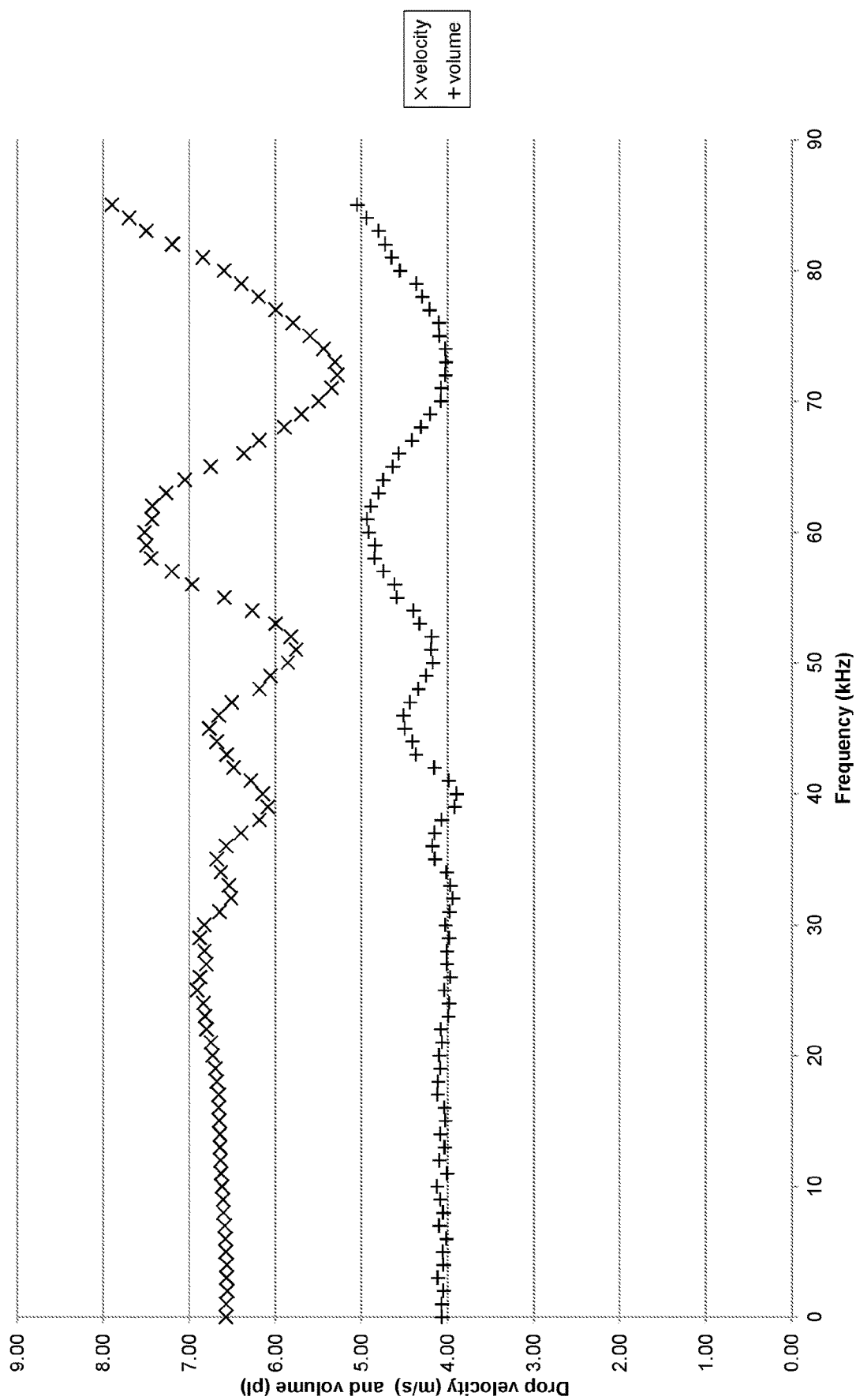
FIG. 1 displays plots of frequency response curves for drop volume and drop velocity for an illustrative droplet deposition head, where no adjustment is carried out.

FIG. 1 displays plots of frequency response curves for drop volume and drop velocity for an illustrative droplet deposition head, which utilises piezoelectric actuator elements.

In more detail, the illustrative droplet deposition head is operated at a range of frequencies using a simplified drive waveform, which consists of a simple, single ejection pulse without non-ejecting (e.g. damping) components and which ejects a single drop. For each frequency, the volume and velocity of the ejected drops is measured.

Thus, one of the curves corresponds to the measured drop volumes, whereas the other of the curves corresponds to the measured drop velocities. Ejection frequency is shown on the x-axis, while droplet volume (in picolitres) and droplet velocity (in m/s) are shown on the y-axis.

As may be seen, the shape of each curve at low frequency is a straight line that is roughly parallel to the horizontal axis. At around 28 kHz, two features begin to emerge:

(1) The volume and velocity curves begin to oscillate, with the oscillations of the two curves being approximately sinusoidal and substantially in phase. The amplitude of the oscillations grows in magnitude with increasing frequency.

Figure 2:
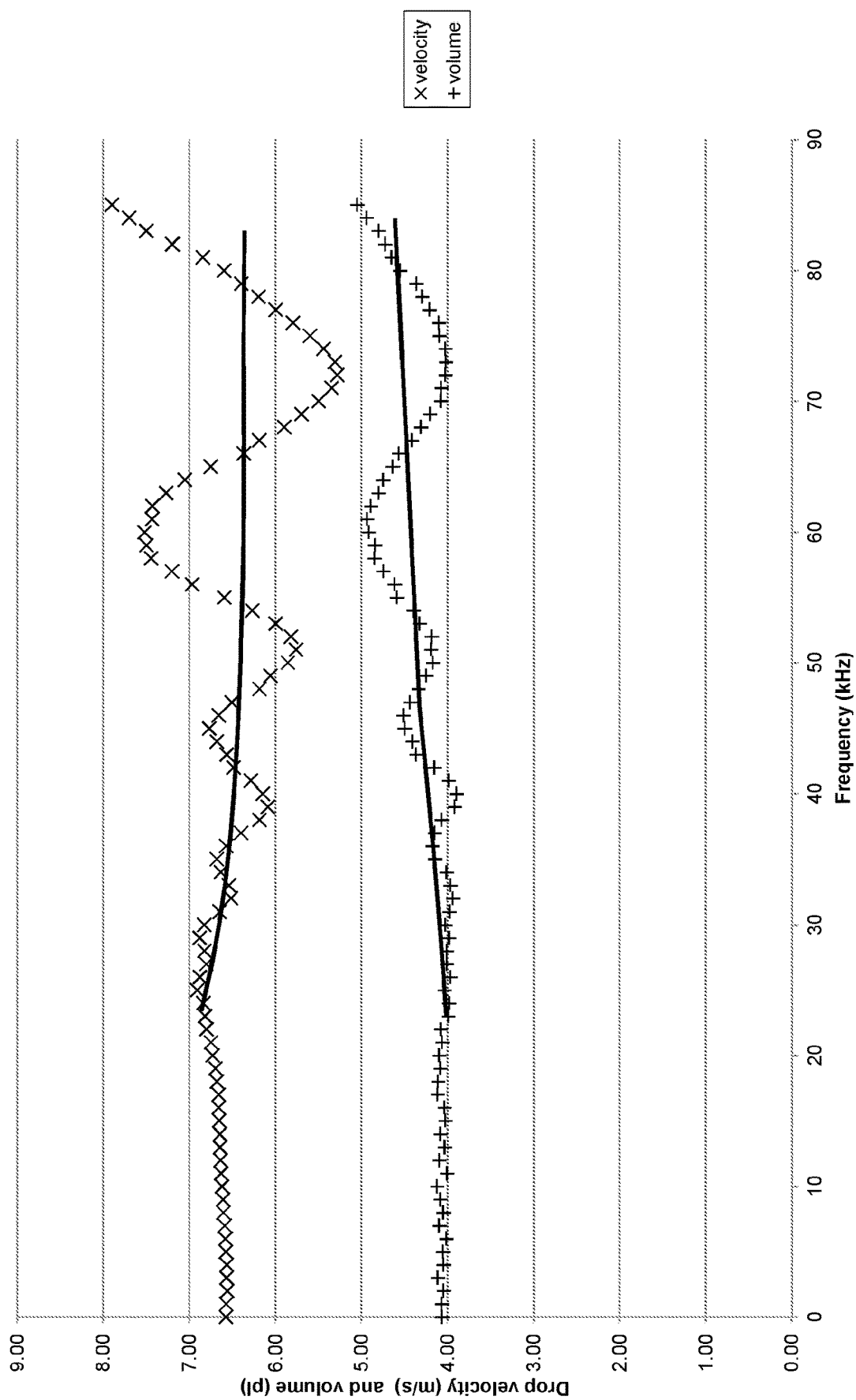
FIG. 2 displays the frequency response curves of FIG. 1, with trend lines added for each response curve.

(2) The trend lines of the two curves (illustrated in FIG. 2) deviate from their initially horizontal trajectories: specifically, the trend line for drop velocity bends downward, while the trend line for the drop volume bends upward. Thus, the trend with increasing frequency is for velocity to decrease and for volume to increase.

The oscillations in the response curves are thought to appear because of the superposition of residual pressure oscillations within the fluidic chamber from previous ejection pulses with the newly-introduced pressure oscillations from the current drop ejection pulse. The increase in amplitude of the oscillations in the response curves result from this superposition of pressure oscillations within the fluid chamber.

In addition, it is thought that this superposition of pressure oscillations causes the mean position of the meniscus within the nozzle to depart from its rest or unperturbed position. In the specific case illustrated in FIGS. 1 and 2, following ejections of droplets, the meniscus moves closer to the exit of the nozzle, in a forward position from the quiescent state. This movement is a significant cause of the departure of the trend-lines from their initially horizontal trajectories in FIGS. 1 and 2.

Theoretically, the primary fluidic oscillations within a fluid chamber occur at two frequencies: the Helmholtz resonance frequency and the capillary refill resonance frequency. With damping levels that would be provided by a typical fluid chamber, the Helmholtz oscillations persist long enough that for higher jetting frequencies they will interact with the subsequent ejection oscillations.

Figure 3:
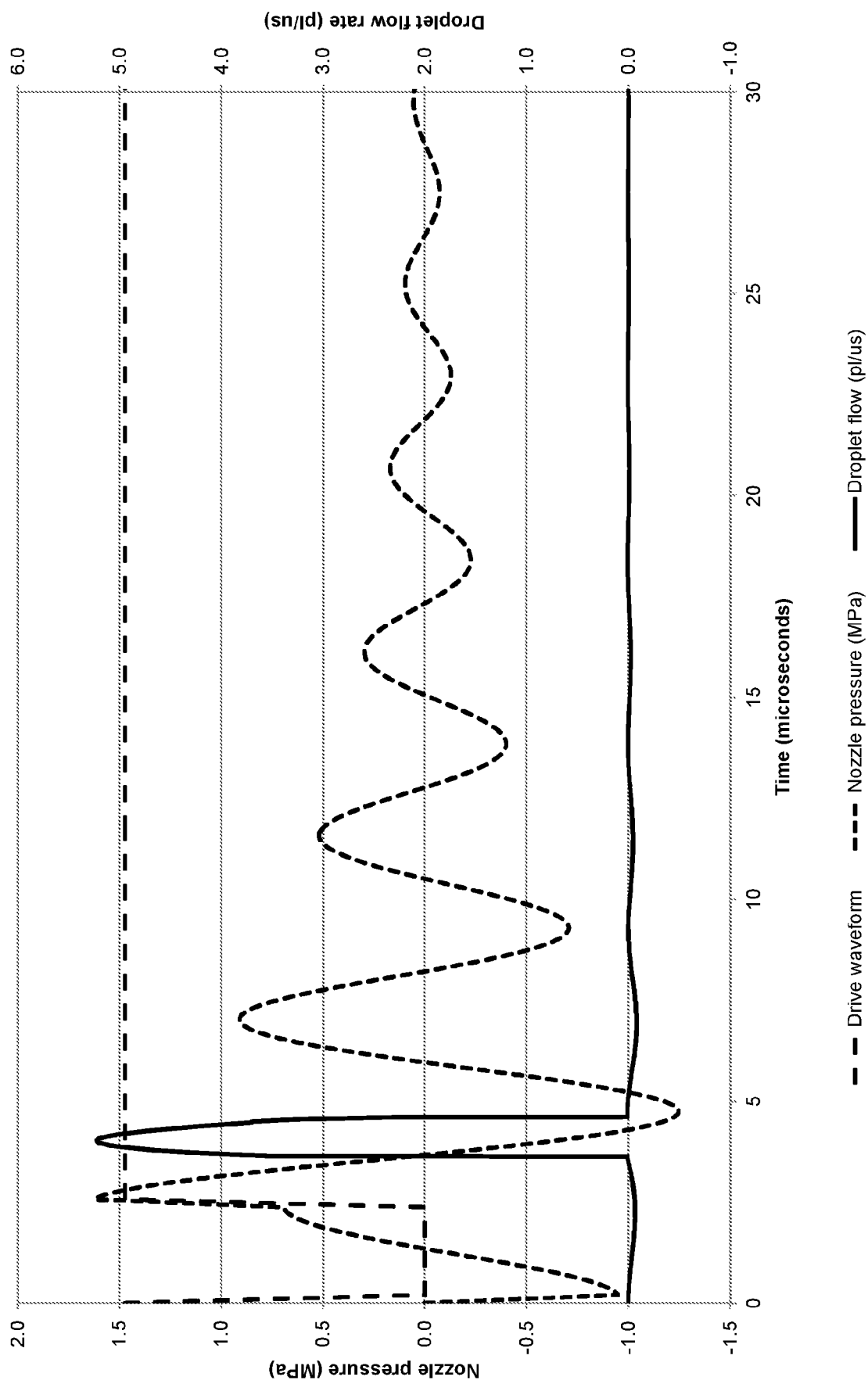
FIG. 3 illustrates the pressure within a chamber adjacent its nozzle, and the flow rate through the nozzle, following the application of a single drive waveform to an actuating element for the chamber.

The effects of a single drive waveform are illustrated in FIG. 3, which illustrates, with respective curves, the drive waveform, the pressure within the chamber adjacent the nozzle, and the flow rate through the nozzle (which results from the displacement of the meniscus from its rest position). As may be seen from FIG. 3, the drive waveform consists of a single ejection pulse, which in the particular example shown is trapezoidal in shape.

As is apparent from the peak in the nozzle flow rate curve, droplet ejection occurs only 1-2 microseconds after the drive waveform pulse is completed. However, residual pressure oscillations within the chamber persist for a considerable period of time after droplet ejection—for around 40 microseconds.

Attempts have been made by the Applicant to dynamically adjust the drive waveform corresponding to FIG. 1 so that the drop volume remains substantially equal to a desired, or targeted, drop volume value over much of the frequency range.

Since each of drop volume and drop velocity varies with frequency, to make one of them substantially equal to a targeted value at all frequencies (or at substantially all frequencies), the amount of the adjustment to the drive waveform must similarly vary with frequency. Thus, it was necessary to determine a series of adjustment values, each of which corresponds to a particular frequency and, more particularly, to the amount of adjustment to the drive waveform that is required to achieve the targeted drop volume at that particular frequency. In this particular case, each adjustment value corresponded to an amount by which the peak voltage was adjusted.

In one series of experiments, the value of the drop volume at low frequencies (in the absence of any adjustment of the drive waveform) was selected as the targeted drop volume value, for the sake of simplicity. For each frequency where the drop volume was outside of a selected tolerance band, specifically a ±5% tolerance band, of this targeted drop volume value, the drive waveform was adjusted, in terms of its peak voltage, by an amount calculated to achieve the targeted drop volume value. The results of these experiments are illustrated in FIG. 4.

Figure 4:
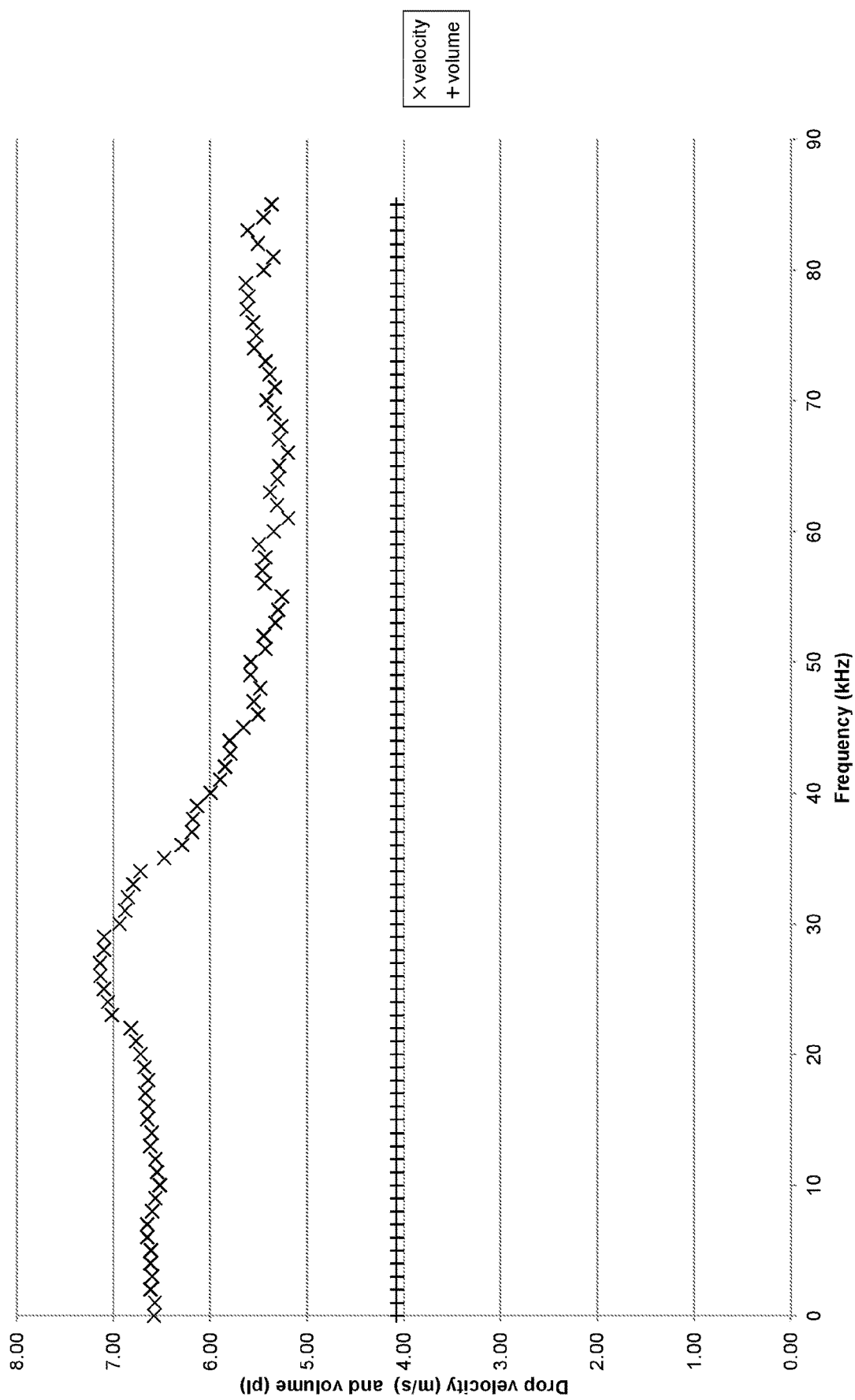
FIG. 4 displays plots of response curves for the head whose results are shown in FIG. 1 following dynamic adjustment of the head to achieve a targeted drop velocity value at each frequency.

As may be seen from FIG. 4, it is found that, because the volume and velocity response curves are approximately in phase, such adjustments may lessen, or substantially remove, the oscillations in the velocity response curve, as well as "flattening" the volume response curve. However, the trend in the velocity response curve—that drop velocity generally decreases with increasing frequency—is exacerbated by such adjustments. This trend is apparent from FIG. 4.

A droplet deposition head that dynamically adjusts the drive waveforms sent to its actuator elements in such a way may, therefore, exhibit increased misplacement of droplets for those actuator elements that operate at higher frequencies. In consequence, the deposition continues to be highly non-uniform.

Attempts have also been made by the Applicant to adjust the drive waveform corresponding to FIG. 1 so that the drop velocity (rather than the drop volume) remains substantially equal to a desired, or targeted, drop velocity value over much of the frequency range.

Therefore, in another series of experiments, the drive waveform was adjusted at each frequency (again, in terms of its peak voltage) so that the drop velocity (rather than the drop volume) was substantially equal to a targeted drop velocity value. In these experiments, a similar effect was identified. Specifically, it is found that, while the adjustments reduce the oscillations in the volume curve (as well as "flattening" the velocity response curve), the trend in the volume response curve—that drop volume generally increases with increasing frequency—is exacerbated.

A droplet deposition head that dynamically adjusts the drive waveforms sent to its actuator elements in such a way may, therefore, eject droplets of different sizes, with actuators elements that operate at high frequencies ejecting larger droplets, and actuators elements that operate at low frequencies ejecting smaller droplets. In consequence, the performance of the head remains non-uniform.

The design of droplet deposition heads balances many factors including: maximum drop velocity; specific droplet fluid properties such as viscosity, surface tension and density; lifetime of the actuator; dimensions of the actuator and fluidic passages; and peak actuation voltage. Such factors may be determined, at least in part, by the intended use of the head.

Figure 5:
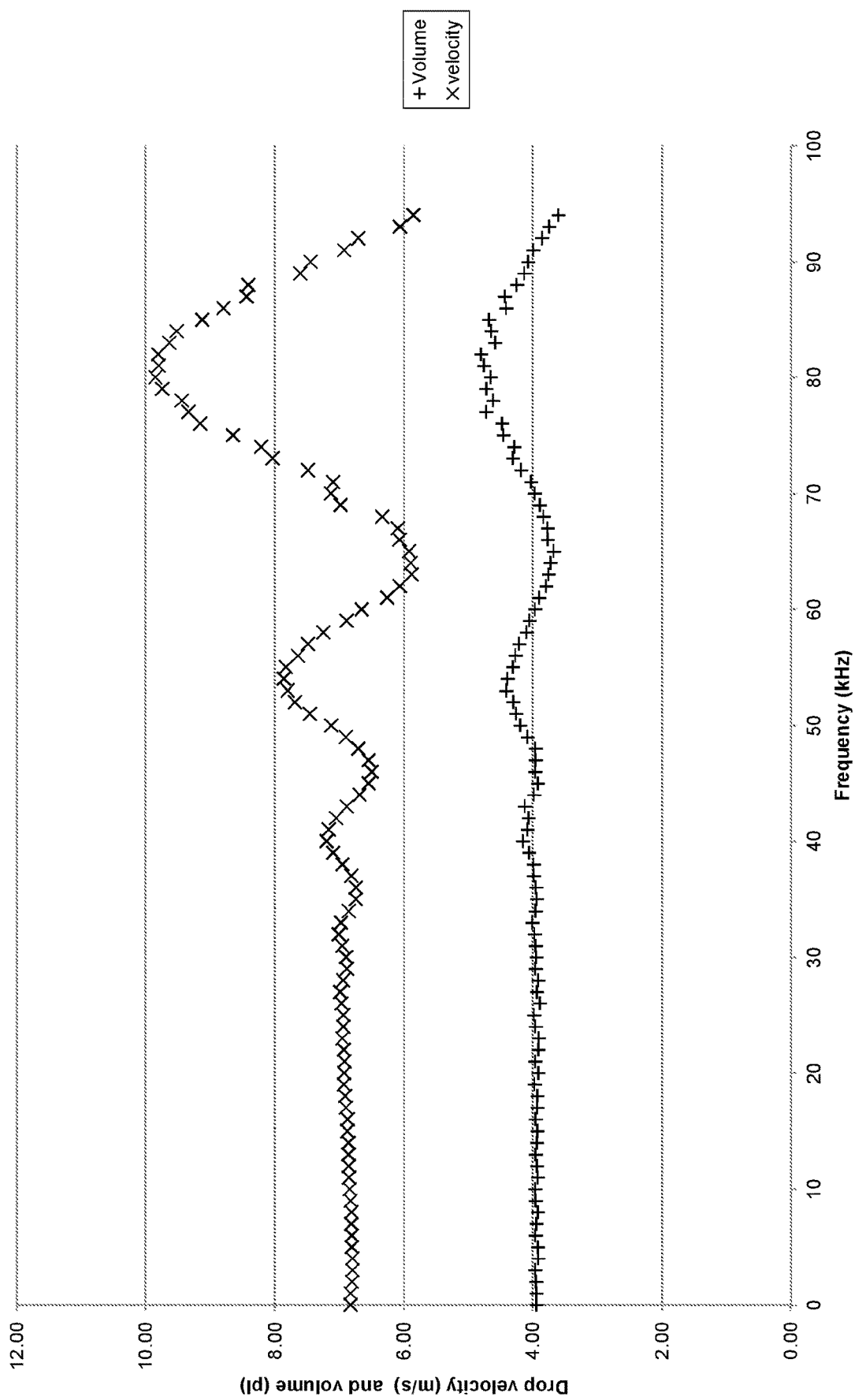
FIG. 5 displays plots of frequency response curves for drop volume and drop velocity for an illustrative droplet deposition head, where the response curves are roughly parallel to the x-axis.

As a result, different droplet deposition head constructions may have different response curves for velocity and volume. For some head constructions, these response curves may each have a trend line that is roughly parallel to the x-axis, as illustrated in FIG. 5, rather than being curved, as in the case of FIG. 2. In other words, with increasing frequency, the recorded values of drop velocity and volume may oscillate about the low frequency values of, respectively, drop velocity and volume (i.e. without an upward or downward trend). As may be seen from FIG. 5, for each of the response curves over the whole of the frequency range, the values of the local minima of the curves are less than (or approximately equal to) the values at the lower end of the test range. Conversely, the values of the maxima for the curves are greater than (or approximately equal to) the values at the lower end of the test range.

With such head constructions, attempts have been made by the Applicant to adjust the drive waveform corresponding to FIG. 5 so that the drop volume remains substantially equal to a desired, or targeted, drop volume value over much of the frequency range.

In one series of experiments, the value of the drop volume at low frequencies (in the absence of any adjustment of the drive waveform) was selected as the targeted drop volume value, as with the experiments detailed above with regard to FIG. 4.

Figure 6:
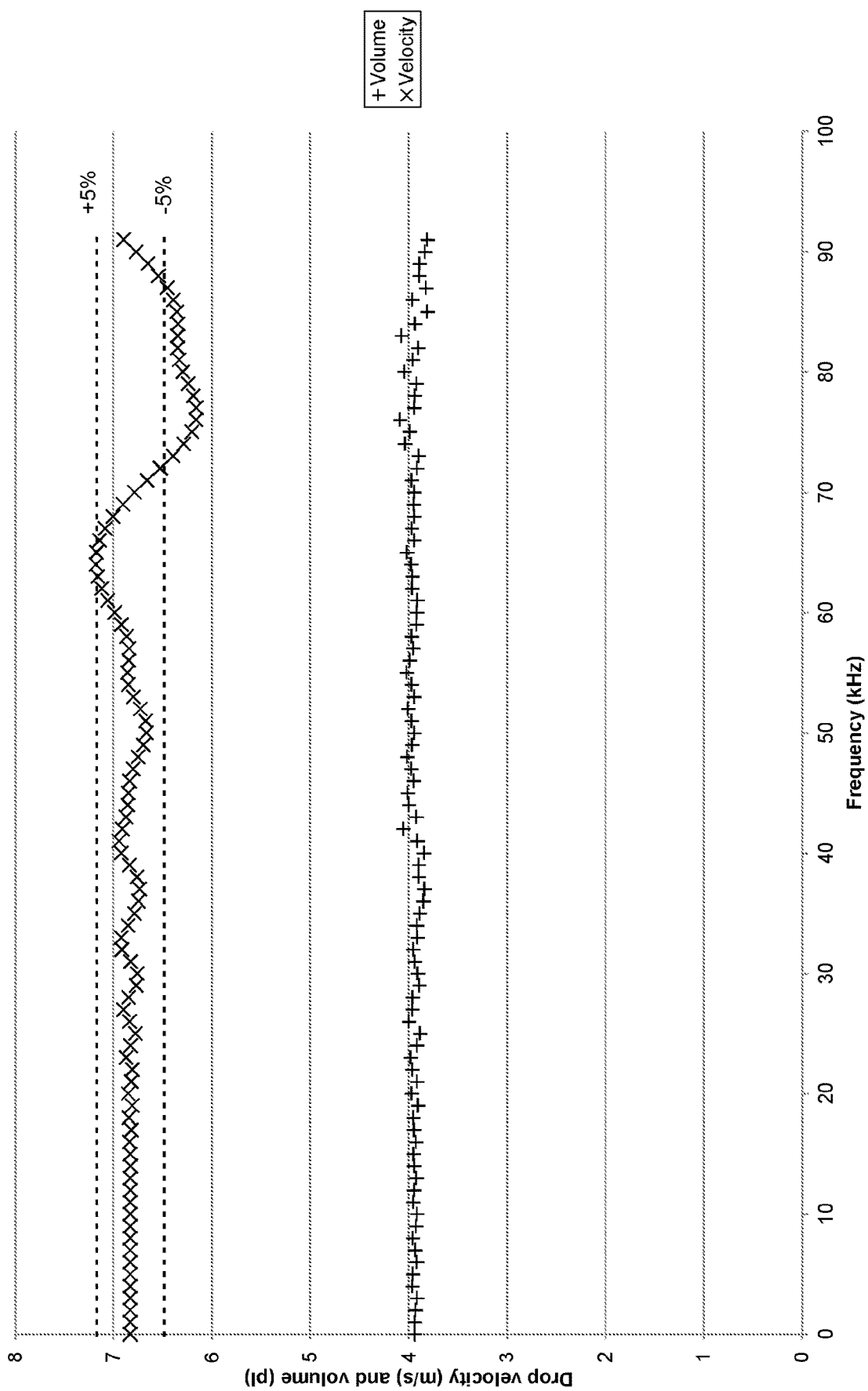
FIG. 6 displays plots of response curves for the head whose results are shown in FIG. 5 following dynamic adjustment of the head to achieve a targeted drop velocity value at each frequency.

FIG. 6 displays illustrative results for such experiments. As is apparent, because the volume and velocity response curves are approximately in phase, the adjustments to the drive waveform to "flatten" the drop volume response curve have also significantly lessened the oscillations in the velocity response curve. Nonetheless, there is still significant variation in drop velocity, especially at higher frequencies: from 72 kHz upwards, the velocity values lie outside of a ±5% tolerance band. Thus, with such heads also, performance for some applications is insufficiently uniform.

Similarly, attempts have been made by the Applicant to adjust the drive waveform so that the drop velocity (rather than the drop volume) remains substantially equal to a desired, or targeted, drop velocity value over much of the frequency range. In such cases, essentially the reverse situation is encountered: although the adjustments to the drive waveform significantly lessen the oscillations in the volume response curve (as well as substantially "flattening" the drop velocity response curve, as intended), there is still significant variation in drop volume, especially at higher frequencies. Thus, with such heads also, performance is insufficiently uniform.

In view of the issues with non-uniform performance identified above with reference to FIGS. 4 and 6, the Applicant considers that a different approach should be adopted for determining suitable dynamic adjustments to a drive waveform.

In most cases, because of the volume of data that must be managed, the following steps will be carried out at the manufacturing site after the testing of a droplet deposition head: in other words, prior to shipping to a customer. However, particularly sophisticated customers might choose to carry out some or all of the steps themselves.

The method according to this different approach may be implemented with a variety of drive waveforms. However, purely for the sake of simplicity, the approach will be described below with reference to a drive waveform consisting of a single trapezoidal pulse, as shown schematically in FIG. 7. In general, an appropriate drive waveform will have been selected based on the specific construction of the droplet deposition head as well as other factors, such as the particular fluid to be ejected. It will be understood that, given that what is being described here is the adjustment of drive waveforms, rather than the drive waveforms themselves, the details of the drive waveform itself are beyond the scope of this document.

Selection of a Suitable Waveform Parameter

Figure 7:
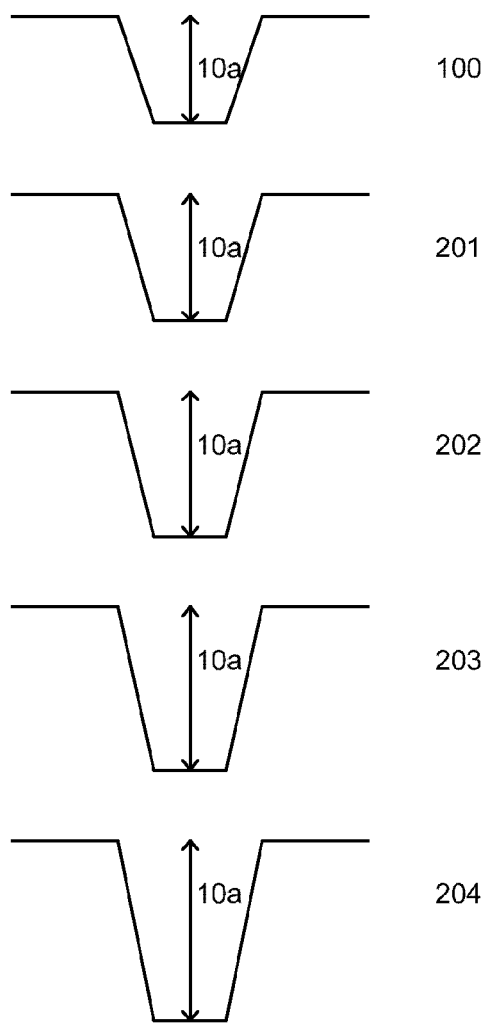
FIG. 7 illustrates the variation of a particular waveform parameter, namely pulse amplitude, of a basic drive waveform.

According to this different approach, as an initial step, a suitable waveform parameter 10 is chosen. This may, for example, as illustrated in FIGS. 7 and 8 and described in more detail below, be one of pulse amplitude 10a, pulse width 10b, peak-to-peak height 10c, slew rate H1/D1 of a basic drive waveform 100, the width 10d or amplitude 10e of a portion removed from the basic drive waveform 100, or any other suitable waveform parameter. For example, FIG. 7 illustrates the waveform parameter 10 as being the pulse amplitude 10a. In addition to showing the basic drive waveform 100, a series of adjusted drive waveforms 201-204 are shown, each of which is adjusted in terms of the waveform parameter 10, pulse amplitude 10a. As will be discussed in further detail below, each of these adjusted drive waveforms may be associated with a specific operating frequency of the head.

Figure 8A:
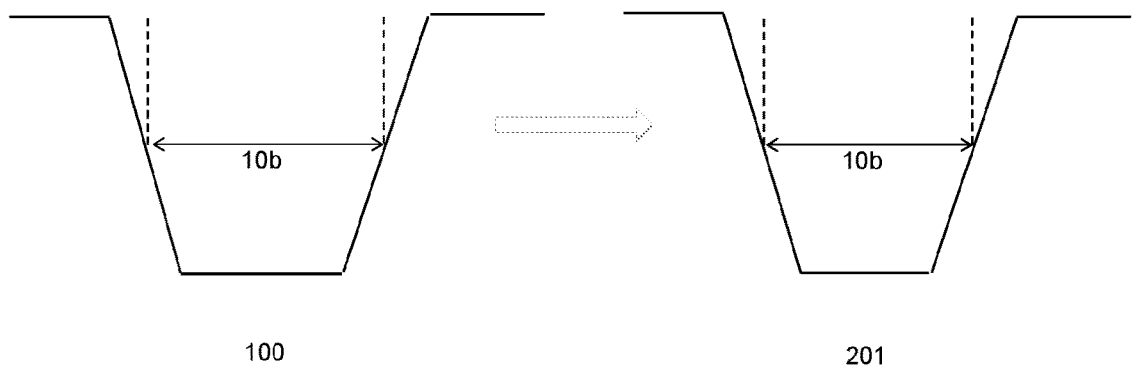
FIGS. 8A-8E illustrate further examples of suitable waveform parameters.

FIG. 8A, by contrast, illustrates an example where the waveform parameter 10 is pulse width 10b. While the specific example shown in FIG. 8A illustrates pulse width 10b as being defined at the half-height of the pulse, the pulse width might be defined in any appropriate manner, for example at the peak or at the base of the pulse. FIG. 8A illustrates both the basic drive waveform 100 of FIG. 7 and an adjusted drive waveform 201, which is adjusted in terms of this waveform parameter 10, pulse width 10b. The adjusted drive waveform 201 is one of a series of adjusted drive waveforms, as in the example illustrated in FIG. 7; each of these adjusted drive waveforms may be associated with a specific operating frequency of the head.

Figure 8B:
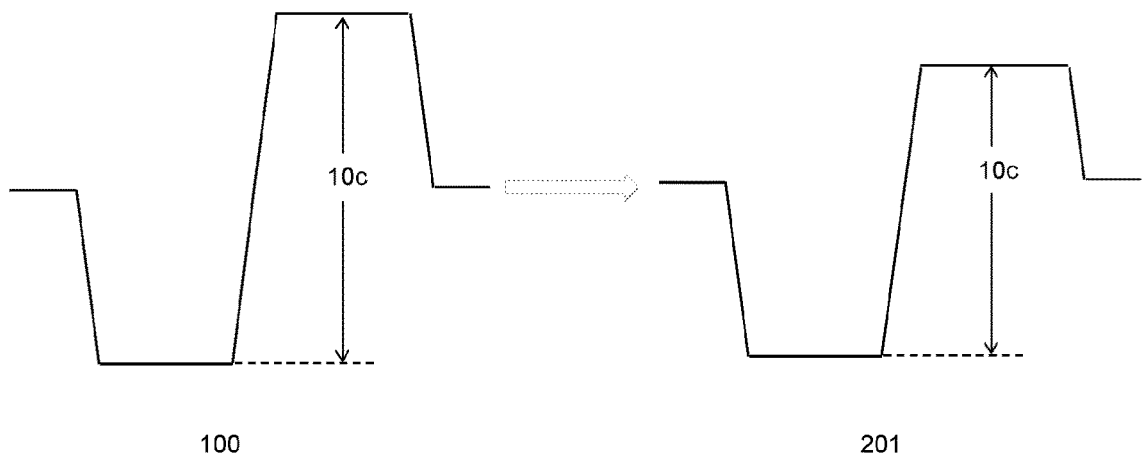

FIG. 8B similarly illustrates a further example where the waveform parameter is peak-to-peak height 10c and thus illustrates both the basic drive waveform 100 of FIG. 7 and an adjusted drive waveform 201 (again, one of a number of adjusted drive waveforms, each of which may be associated with a specific operating frequency of the head), which is adjusted in terms of this waveform parameter 10, peak-to-peak height 10c.

Figure 8C:
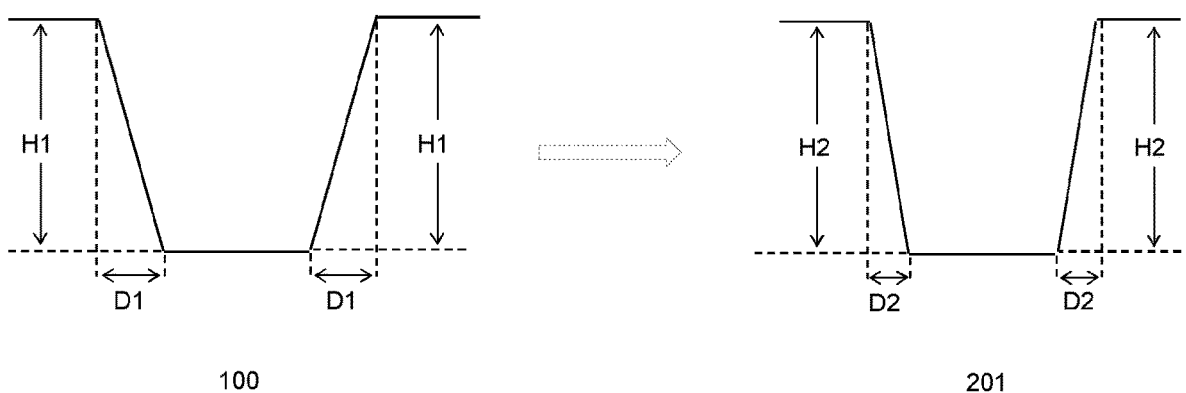

FIG. 8C similarly illustrates another example where the waveform parameter 10 is slew-rate and thus illustrates both the basic drive waveform 100 of FIG. 7 and an adjusted drive waveform 201 (again, one of a series of adjusted drive waveforms, each of which may be associated with a specific operating frequency of the head), which is adjusted in terms of this waveform parameter 10, slew-rate.

In the specific example shown in FIG. 8C, the leading and trailing edges of the basic drive waveform 100 have the same slew-rate, H1/D1. Similarly, the leading and trailing edges of the adjusted drive waveform 201 have the same slew-rate, H2/D2. As may be seen, the slew-rate of the adjusted drive waveform 201 is greater than the slew-rate of the basic drive waveform 100.

In other examples, the slew-rate of the leading and falling edges may be different, and/or only one edge of the basic waveform could be adjusted instead. In such a case (or in other cases) the leading and trailing edges of the adjusted waveforms may not have the same slew rate.

Figure 8D:
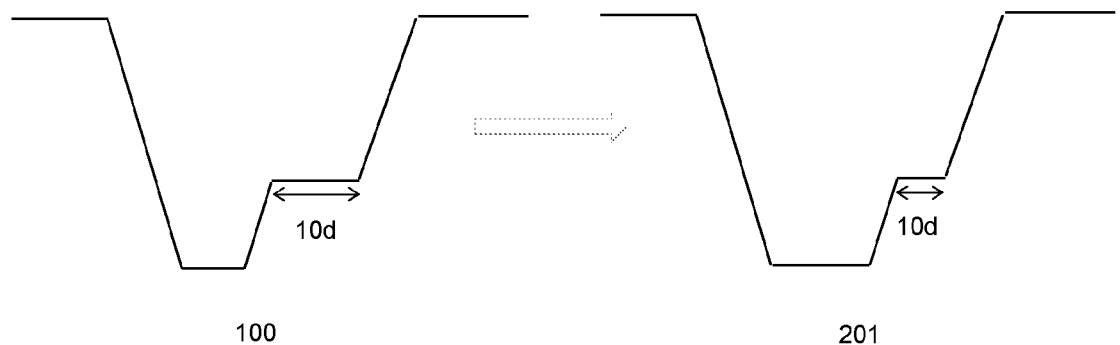

FIG. 8D illustrates a still further example, where the waveform parameter is the width 10d of a portion removed from the basic drive waveform 100 (specifically, the basic drive waveform 100 shown in FIG. 7). There is shown an adjusted waveform 201 with respective values for the waveform parameter in question, the width 10d of a portion removed from the basic drive waveform 201.

Figure 8E:
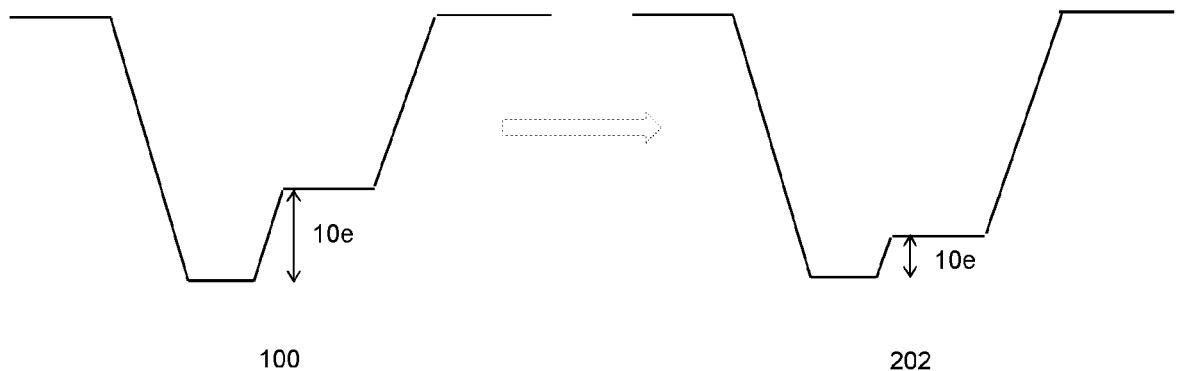

FIG. 8E illustrates yet a further example, where the waveform parameter is the amplitude 10e of a portion removed from the basic drive waveform 100 (specifically, the basic drive waveform 100 shown in FIG. 7). There is shown an adjusted waveform 202 with respective values for the waveform parameter in question, the amplitude 10e of a portion removed from the basic drive waveform 202.

In more detail, the electronics of the head may be configured such that the drive waveform applied to each actuator element is formed in part by a common drive waveform. The drive circuitry of the head may then adjust this common drive waveform by a corresponding amount for each actuator element, so as to provide an individually adjusted waveform for each actuator element. Portions of the CDW are selected by the driver IC to provide the drive waveform for each actuator and then, if desired, some or all of the pulses within the drive waveform are modified or modulated (that is, "trimmed") in the driver IC within the head for each actuator.

This common drive waveform (CDW) may be generated by circuitry located away from the actuator elements of the head; indeed, the CDW generating circuitry may be located outside the head. A possible consequence is that a significant proportion of energy dissipation occurs in the CDW generation circuitry, rather than, for example, the drive circuitry of the head (which will generally be close to the actuator elements so as to reduce electrical crosstalk and/or undesired power loss in the traces that connect the drive circuitry to the actuator elements). Because the actuator elements are distant from the CDW generation circuitry, the associated heat of such energy dissipation may not reach the actuator elements, which may make thermal control of the head more straightforward.

With a head having such electronics, the common drive waveform might, for example, correspond to a simple pulse, or a series of such pulses. For instance, the CDW might be similar to the basic drive waveform 100 shown FIG. 7. Then, where the waveform parameter is the width 10d of a portion removed from the basic drive waveform 100, as shown in FIG. 8D, the drive circuitry may, for example, form an adjusted drive waveform by coupling the CDW to an actuator element, then, at a time corresponding to the beginning of the portion to be removed, decoupling the CDW from the actuator element, and then, at a time corresponding to the end of the portion to be removed, recoupling the CDW from the actuator element. During the time period corresponding to the portion to be removed, the drive circuitry might, for instance, couple the actuator element to a reference voltage. As will be appreciated, the drive circuitry will control the length of time that the CDW is decoupled from the actuator element so as to achieve the desired value of the width 10d of the portion removed from the basic drive waveform 100. To provide accurate control of the width 10d of the portion removed from the basic drive waveform 100 may be straightforward since the timing of coupling and decoupling of the CDW may be controlled accurately with relatively simple drive circuitry.

Where, instead, the waveform parameter is the amplitude 10e of a portion removed from the basic drive waveform 100, as shown in FIG. 8E, the drive circuitry may operate in a generally similar manner, but with the actuator element being coupled to a selected one of a number of reference voltages, with the selected reference voltage corresponding to the amplitude 10e of the portion to be removed from the basic drive waveform 100.

From these non-limiting examples, it should be understood that the waveform parameter may, for example, represent a feature or aspect of the basic drive waveform that can (at least in theory) be smoothly varied. Thus, a series of adjustments of the waveform parameter may be represented by a corresponding series of typically non-integer values. Accordingly, the waveform parameter is a continuous variable and thus the amount of adjustment in terms of the selected waveform parameter may be represented by an adjustment value that is also a continuous variable, even though, owing to hardware or software constraints, not all adjustment values may in practice be achieved for the waveform parameter. For example, the value of the pulse width—and therefore adjustments thereto—may be considered a continuous variable, even though the electronics of a head may only allow pulse widths that are multiples of 0.1 microsecond. Accordingly, appropriate head electronics may allow for the waveform parameter to take at least 10 different values, in some cases at least 50 different values and, potentially, at least 100 different values.

Experiments carried out by the Applicant indicate that with each of the waveform parameters discussed above with reference to FIGS. 7 and 8A-8E, both drop volume and drop velocity will typically each depend monotonically on the value of the waveform parameter in question. As will be discussed in more detail below, where each of drop volume and drop velocity depends monotonically on the value of the waveform parameter—and therefore on the adjustment value—identification of a suitable adjustment value for each frequency may be simplified.

It may also be understood from the examples of FIGS. 7 and 8A-8E that a class of suitable waveform parameters may be defined such that, where the value of a waveform parameter belonging to the class is altered, there is a corresponding change in the area under the curve of the waveform.

A related class of suitable waveform parameters may be defined such that, where the value of a waveform parameter belonging to the class is progressively altered, there is a corresponding progressive change in the energy imparted to the droplet ejected.

Testing of the Head

Once the waveform parameter has been selected, a droplet deposition head is then tested, with the selected waveform parameter being varied to determine its effect on the volume and velocity of the droplets ejected over a range of frequencies (a "test range" of frequencies).

The testing may be carried out on individual heads before shipment to a customer, in which case the adjustment values that are calculated will be specific to each head and may be stored in the data storage associated with the head.

As an alternative to testing each individual head, the testing may be carried out on a representative test head (or a number of such representative test heads), which has substantially the same construction as the droplet deposition head on which the calculated adjustment values will be implemented, before shipment. Such a representative test head (or representative test heads) could, for instance, be a head selected randomly from each batch of heads during manufacture, with the aim being that the adjustment values are generally appropriate for all heads within that batch.

The testing may also be carried out at a customer site, so as to take account of the particular environment that the heads experience, including for example the ambient temperature, specific fluid supply system and the like. Moreover, such testing may be repeated over the life of the head so as to update the adjustment data associated with it. This may allow, for instance, for changes in the performance of the head over its life (e.g. owing to ageing of the piezoelectric actuating elements) to be accounted for.

Test data is collected by operating the droplet deposition head or the representative test head (or test heads) in a number of tests, where each of these tests uses a different one of a set of test waveforms. The set of test waveforms includes a basic drive waveform 100 and a number of adjusted drive waveforms 201-204, each of which corresponds to the basic drive waveform being adjusted in terms of the chosen waveform parameter. The test waveforms each correspond to a different value for the selected waveform parameter. Therefore, the data illustrated in FIG. 5 could be thought of as the result of one such test.

Each test is carried out over the same frequency range (for example, from about 1 kHz to about 95 kHz, as in FIG. 5), with the volume and velocity of the ejected droplets being recorded for the same test frequencies within this frequency range, so as to build up a series of volume and velocity response curves corresponding to the series of test waveforms. The test frequencies may be distributed over the test range in an evenly spaced manner; for instance, successive frequencies might increase by 1 kHz.

Such tests therefore provide recorded values of the volume and velocity at each of the test frequencies and for each of the set of test waveforms.

Fitting the Test Data

The tests may therefore provide test data, with these recorded values being represented within such test data. In one example, the recorded values might simply be stored as part of the test data.

However, in other examples, parameters that define the response curves (perhaps approximately) for each test waveform might be stored as part of the test data instead. For instance, one curve may be fitted to the recorded values for the droplet velocities and another curve may be fitted to the recorded values for the droplet volumes.

Such fitting may address noise or scatter in the recorded values that may, for example, be due to measurement errors, or transient phenomena, such as air bubbles in the fluid chambers of the head.

Fitting can be conducted with a function for the theoretical frequency response curve for the particular drive waveform utilised. In other examples, fitting functions may be derived empirically, in other words without detailed knowledge of the physics that results in the particular shape of the response curves.

Once a particular fitting function has been chosen, the fitting process may include determining respective values for each of a number of parameters for the fitting function. For instance, these values may be determined by using a least squares approach.

One example of a fitting function that may be appropriate for rectangular drive waveforms (or approximately rectangular waveforms, such as trapezoidal waveforms with relatively steep leading and trailing edges) is:

$$R(f) = R_0 + R_1(f - f_0) + R_2 e^{-\frac{\pi}{Q}\left(\frac{f_H - f}{f}\right)} \cos\left\{2\pi\left(\frac{f_H - f}{f}\right)\right\}$$

where R(f) is the general response (for drop speed or volume) as a function of the jetting frequency f, and $R_0$, $R_1$, $R_2$, Q, $f_0$ and $f_H$ are the fitting parameters related to the following: $R_0$ is the constant value at low frequencies, $R_1$ is the slope of the mean envelope, $R_2$ is the maximum amplitude of the sinusoidal oscillations, Q is the quality factor (inverse of damping), $f_0$ is the frequency at which the slope begins to appear and $f_H$ is the Helmholtz frequency of the fluidic system.

A further example of a fitting function that may be appropriate for rectangular drive waveforms (or approximately rectangular waveforms), and where like variables and constants as in the previous fitting function retain the same meaning, is:

$$R(f) = R_0 \frac{1 - \cos\left(\frac{2\pi f_H}{f}\right) e^{-\frac{\pi f_H}{Qf}}}{1 + e^{-\frac{2\pi f_H}{Qf}} - 2\cos\left(\frac{\pi f_H}{f}\right) e^{-\frac{\pi f_H}{Qf}}}$$

For the more realistic case where the drive pulse has a trapezoidal shape, a related but more complicated response function is used.

Fitting may be carried out only on a certain portion of the range of test frequencies, for instance only the portion of the test frequency range where the drop volume and/or drop velocity values lie outside of a desired tolerance band (e.g. a ±5% tolerance band) relative to desired drop volume and/or velocity values (which will be discussed in further detail in the following section).

More subtly, fitting may be carried out piecewise on the test data corresponding to different portions of the test range. The same fitting function could be used for each portion of the test range (though, of course, a different set values would be calculated for the parameters of the fitting function in respect of each of the portions of the test range), or different fitting functions could be used for different portions of the test range. For instance, a linear function could be fitted to the low frequency portion of the range, whereas an oscillating function could be fitted to the higher frequency portion of the range.

Figure 9A:
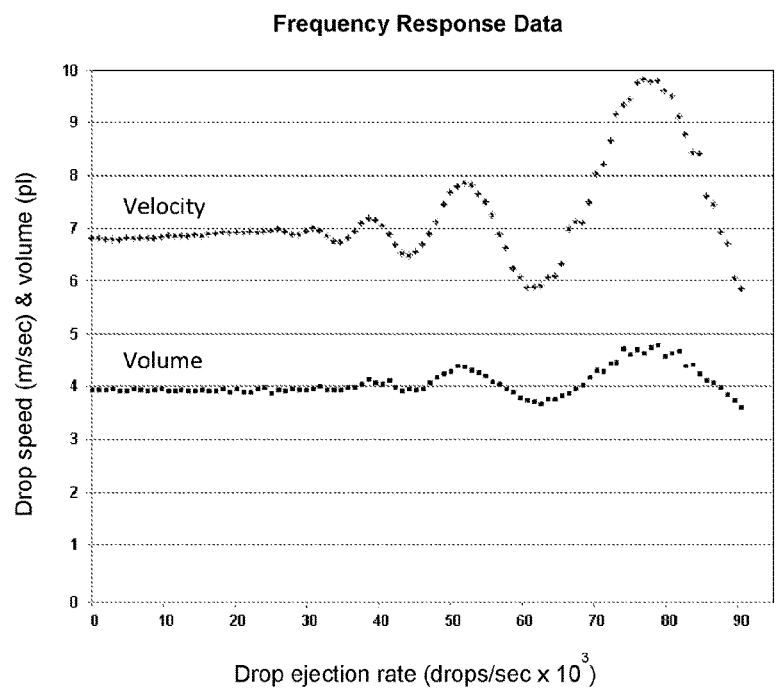
FIGS. 9A and 9B illustrate the fitting of a curve to droplet volume and velocity test data.
Figure 9B:
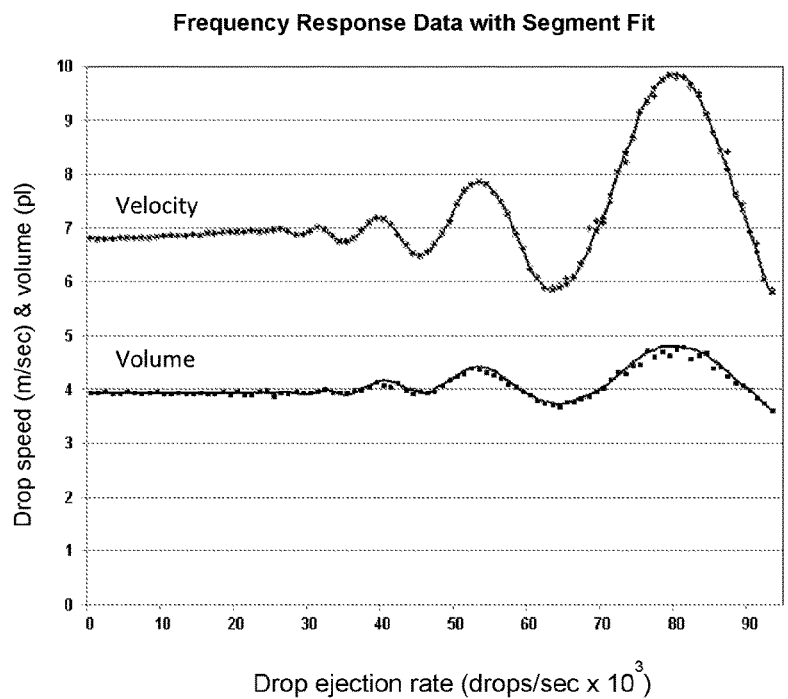

FIGS. 9A and 9B illustrates an example in which piecewise fitting has been carried out on the test data shown in FIG. 5: FIG. 9A illustrates the test data itself and FIG. 9B illustrates the test data with the piecewise fitted curves overlaid on the data points. As may be seen, the fitted curves pass smoothly through the data points for both velocity and volume.

It should be noted that fitting may also be conducted using smoothing algorithms, splines, or a combination of fitting approaches.

Thus, where fitting is carried out, the parameters for the fitted curve may be stored as part of the test data.

Processing of the Test Data

In the next step of the procedure, the test data are processed so as to determine suitable adjustments (in the form of a set of adjustment values) to the drive waveform that will be implemented on the same head for later operation or, where the tests have been carried out on a representative test head, on one or more heads of substantially the same construction for later operation.

Where the head that is tested is intended for shipment to a customer (and thus is not a representative test head), such data processing may, for example, be carried out automatically following testing. Thus, the testing and processing steps may form part of a single, automated process.

In any case, as part of, or prior to the processing of the test data, suitable "targeted" values for the volume and velocity of droplets are chosen. For example, these may be volume and velocity values characteristic of a certain portion of the test range. This might, for instance, be a low frequency portion of the test range (as discussed above with reference to FIG. 4), such as a portion corresponding to subharmonic oscillations, such as subharmonics of Helmholtz oscillations. These will be present at frequencies below the Helmholtz frequency, specifically at frequencies that are integer sub-multiples of the Helmholtz frequency.

The targeted values may instead (or in addition) include a desired volume value (for example, if it is desirable that the particular droplet deposition head will eject droplets of 4 pl) as the targeted volume value, with the targeted velocity value being the velocity that was recorded for droplets having this desired volume value (or one of the velocity values, where several were recorded as having the desired volume value). Conversely, the targeted values could include a desired velocity value as the targeted velocity value, with the targeted volume value being the volume that was recorded for droplets having this velocity value (or one of the volume values, where several were recorded as having the desired velocity value).

In still further examples, both the targeted volume and the targeted velocity value may be "desirable" values, in the sense that those specific values have not been recorded for droplets during testing of the droplet deposition head. However, because volume and velocity are not in general independent of one another, a free choice of both volume and velocity values is typically not available.

Nonetheless, the test data may be used to determine which pairs of targeted droplet velocity and volume values, $vel_T$, $vol_T$ may be achieved.

In more detail, the choice of targeted droplet volume and velocity values, $vol_T$, $vel_T$ may be informed by an understanding of the approximate relationship between them. More particularly, the targeted droplet velocity and volume values, $vel_T$, $vol_T$, are approximately related such that:

$$\frac{vel_T - vel_0}{\alpha} = \frac{vol_T - vol_0}{\beta}$$

Where $\alpha$ and $\beta$ are, respectively, the sensitivity of velocity and volume to changes in the waveform parameter, and $vel_0$ and $vol_0$ are, respectively, the values of velocity and volume at low frequencies.

Using this relation, suitable pairs of targeted droplet velocity and volume values, $vel_T$, $vol_T$ may be selected.

How these targeted values are utilised, as well as the details of the processing of the test data more generally, will now be described.

Specifically, for each of a number of "adjustment" frequencies, a corresponding adjustment value is determined. These adjustment frequencies are distributed over at least a portion of the test range, for example in an evenly spaced manner (e.g. successive frequencies might increase by 1 kHz).

In some cases, this portion of the test range might correspond to those frequencies where the recorded volume and/or velocity values that result from the basic drive waveform lie outside of a predetermined tolerance range (whether defined in absolute or relative terms) of the targeted values. In addition, or instead, the portion of the test range for which the adjustment values are determined might be bounded by a predetermined maximum operating frequency for the head in question (and/or by a predetermined minimum operating frequency).

As will be understood from the discussion above, operating the head with an "adjusted" drive waveform (one which corresponds to basic drive waveform 100 adjusted in terms of the waveform parameter utilised during testing) will often result in different volume and/or velocity values to those recorded with the basic drive waveform 100. These resulting values for the volume and velocity may be referred to as "adjusted" volume and velocity values, $Vol_a$ and $vel_a$, and will generally vary with the waveform parameter adjustment value for the "adjusted" drive waveform.

Furthermore, when a drive waveform with a particular adjustment value for the waveform parameter is used during the testing phase, the corresponding adjusted volume and velocity values will, of course, be known. By contrast, for other adjustment values of the waveform parameter, the corresponding adjusted volume and velocity values may not be known. However, with the selection of a waveform parameter that is a continuous variable, it may be possible to interpolate or otherwise estimate the values of volume and velocity that would result if the waveform parameter is adjusted by a particular adjustment value.

The adjusted volume and velocity values may be estimated using the test data. For example, by analysing the differences between the data for different test waveforms an estimate may be determined for what the resulting values, $vol_a$ and $vel_a$, of volume and velocity would be if the value for the waveform parameter were increased by a particular amount.

This may, for example be accomplished by interpolation between the known adjusted volume and velocity values and/or by determining the sensitivity of each of volume and velocity to changes in the waveform parameter adjustment value. For instance, one or more sensitivity values may be calculated for each of volume and velocity; one sensitivity value could be calculated for all frequencies, or respective sensitivity values could be calculated for bands of frequencies, or for individual frequencies.

As noted above, the processing of the test data involves determining, for each of the "adjustment" frequencies, a corresponding adjustment value.

The selection of a waveform parameter that is a continuous variable may enable adjustment to occur with sufficient precision to result in values for droplet volume and velocity that are substantially equal to the targeted values for droplet volume and velocity.

In one example, determining an adjustment value for each frequency might be accomplished by interpolating (and, optionally, extrapolating) the test data, so as to give estimates for the volume and velocity values that would result from adjustment values lying between those that the head was tested with. Then, for each frequency, the pairs of volume and velocity values would be searched to identify those that fall within the predetermined tolerance range of the targeted drop volume and velocity values. Where several matches are determined, the mean or median of these adjustment values may be selected. This process may be repeated so as to provide an adjustment value for each frequency.

In another series of examples, which will now be described in detail, the determination of the adjustment values may involve (at least indirectly) the use of a goal function, g, of volume and velocity.

In more detail, this goal function acts on both volume and velocity to produce a single value. Thus, the goal function defines a single "rating" for each pair of volume and velocity values. Hence, it provides a single goal to be worked towards as the waveform parameter is varied.

A possible consequence is that determining a suitable value for the waveform parameter is reduced to a one-dimensional, rather than a two-dimensional problem. This may improve the likelihood that a suitable adjustment value is found for each frequency and may thus allow the process to be carried out with reduced supervision, for example substantially automatically.

The goal function may be calculated for the adjusted volume and velocity values, $vol_a$ and $vel_a$, corresponding to a particular adjustment value. The goal function would therefore produce a specific, single goal value $g_a$ corresponding to that adjustment value, where $g_a = g(vol_a, vel_a)$.

Further, the same goal function may be calculated for the targeted values of volume and velocity. The goal function would therefore produce a specific, single goal value $g_T$ corresponding to these targeted values, where $g_T = g(vol_T, vel_T)$ The processing of the test data involves seeking the adjustment value that minimizes the difference between: the value $g_a$ of the goal function g when calculated using $vol_a$ and $vel_a$ and the value $g_T$ of the same function when calculated using the targeted droplet volume and velocity values, $vol_T$ and $vel_T$. Thus, embodiments of the process may be considered as carrying out a one dimensional search for the adjustment value that provides (or is expected to provide) the "nearest" achievable volume and velocity values to the targeted values (the intention being that these "nearest" achievable volume and velocity values lie within a predetermined tolerance range of the targeted values).

As will be seen from the number of specific examples provided below, a variety of functions are suitable for use as goal functions.

For many waveform parameters, volume and velocity may each depend monotonically on the value of the waveform parameter. Thus, if a goal function is used that is a monotonically increasing or decreasing function of both volume and velocity, the goal function may accordingly depend monotonically on the value of the waveform parameter. As a result, an increasing series of waveform parameter values may result in a corresponding increasing, or decreasing, series of goal values. This ordering of the series of goal values may be of assistance in determining an appropriate waveform parameter value.

There now follows a description of several specific examples of suitable goal functions and an explanation of how these illustrative goal functions are involved in determining suitable adjustment values.

Scaled Distance Functions

Figure 10:
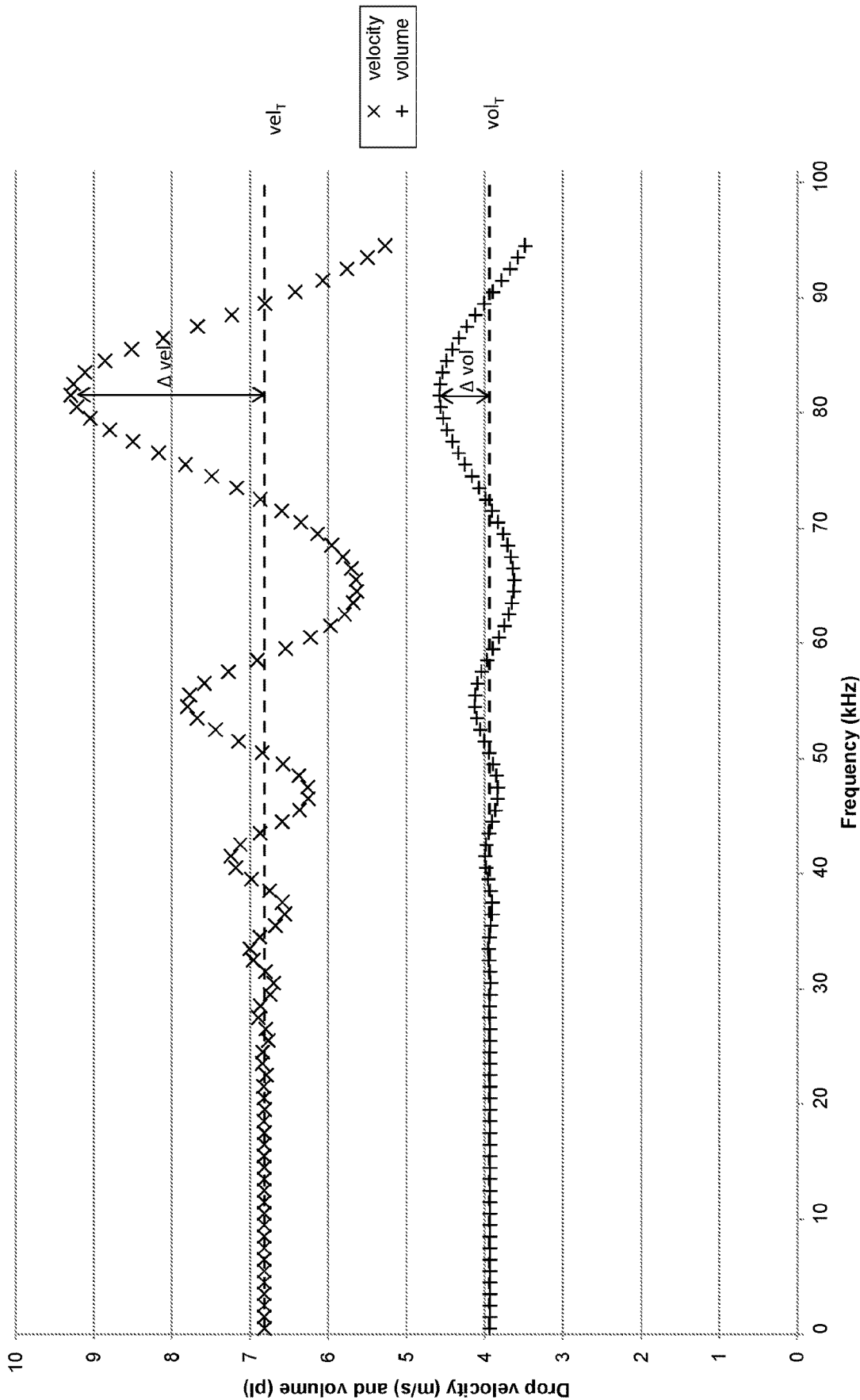
FIG. 10 illustrates a process for determining adjustment values based on scaled differences in droplet volume and velocity.

In the following series of examples, the goal function involves determining a scaled velocity difference value, x, and a scaled volume difference value, y. Unscaled difference values for velocity and volume, $\Delta vel$, $\Delta vol$, are shown in FIG. 10, with these difference values being calculated relative to the low frequency values of velocity and volume.

In more detail, the scaled velocity difference value x is a measure of the difference between the velocity value vel that the goal function operates on, and the targeted value of the velocity, $vel_T$, with the difference normalised using a characteristic velocity value, vel*.

Similarly, the scaled volume difference value y is a measure of the difference between the volume value vol that the goal function operates on and the targeted value $vol_T$ of the volume with the difference normalised using a characteristic volume value, vol*.

Thus, x may be defined by the relation: $x = (vel_T - vel)/vel^*$; and y may be defined by the relation: $y = (vol_T - vol)/vol^*$.

The characteristic values vel* and vol* may be the targeted values $vel_T$ and $vol_T$, and/or may be characteristic of a certain portion of the test range (whether or not the targeted values are characteristic of a certain portion of the test range; indeed, where the targeted values are characteristic of a first portion of the test range, the characteristic values could be characteristic of a second, different portion of the test range). This portion of the test range might, for instance, be a low frequency portion of the test range, such as a portion below subharmonic oscillations.

The goal function may then be defined as:

$$g(vol, vel) = x^2 + y^2,$$

which may be considered the square of the distance from the targeted values $vel_T$, $vol_T$, in normalised volume-velocity space.

Substituting in the expressions above for x and y, gives:

$$g(vol, vel) = \left(\frac{vel_T - vel}{vel^*}\right)^2 + \left(\frac{vol_T - vol}{vol^*}\right)^2.$$

As explained above, we seek the adjustment value that minimizes the difference between the value $g_a$ of the function g when calculated using $vel_a$ and $vol_a$ and the value $g_T$ of the same function when calculated using the targeted droplet volume and velocity values $vel_T$, $vol_T$. Therefore, values for $vel_a$ and $vol_a$ must be obtained.

As noted above, this may be accomplished by analysing the differences between the data for different test waveforms. Specifically, this may, for example, be accomplished by interpolation between the known adjusted volume and velocity values and/or by determining the sensitivity of each of volume and velocity to changes in the waveform parameter adjustment value. For instance, one or more sensitivity values may be calculated for each of volume and velocity; one sensitivity value could be calculated for all frequencies, or respective sensitivity values could be calculated either for bands of frequencies or for individual frequencies.

In the following illustrative example, sensitivity values are calculated for each of volume and velocity.

It should be noted that in the following illustrative example, the waveform parameter 10 is the pulse amplitude 10a for a basic drive waveform 100, in other words, a voltage $U^r$ (where the superscript r denotes that this is the voltage applied to produce the droplets whose volumes and velocities are recorded); however, it will be apparent that any suitable waveform parameter 10 could be used instead. Accordingly, the adjustment value corresponds in this particular example to a change, or adjustment, $U^a$ in voltage (where the superscript a denotes that this is an adjustment to the voltage, this adjustment being applied to the voltage of the basic drive waveform 100, that is, $U^r$).

Expressions for estimates of $vol_a$ and $vel_a$, the droplet volume and velocity corresponding to the adjustment value $U^a$, will now be derived.

Specifically, an estimate for the resulting adjusted value for the volume, $vel_a$, may be calculated using the following relation:

$$vel_a = vel_r + \alpha U^a$$

where $vel_r$ is the recorded value of the velocity at the frequency in question and $\alpha$ is the sensitivity of the velocity to changes in the voltage, U.

The value of $\alpha$ may be determined by, for example, analysing the differences in the values recorded for droplet velocity for different test waveforms. For instance, a specific frequency (e.g. a low frequency, below subharmonic oscillations) may be chosen and the differences between the recorded values for this frequency for the different test waveforms may be analysed.

Thus, for a specific frequency, a first test waveform might have a test voltage $U_1^r$ and a second test waveform might have a test voltage $U_2^r$, where the subscript identifies the particular test waveform. These test voltage values may correspond to recorded velocity values of, respectively, $vel_1^r$ and $vel_2^r$.

A value for $\alpha$ may then be determined by the following relation:

$$\alpha = \frac{vel_2^r - vel_1^r}{U_2^r - U_1^r}$$

It will of course be appreciated that a respective value of $\alpha$ may be calculated for each frequency instead. However, in many cases, the value of $\alpha$ may, to a reasonable level of approximation, be considered constant over a broad range or band of frequencies.

An estimate for the resulting adjusted value $vol_a$ for the volume may be calculated using the following, similar relation:

$$vol_a = vol_r + \beta U^a$$

where $vol_r$ is the recorded value of the volume at the frequency in question and $\beta$ is the sensitivity of the volume to change in the voltage, U. A value, or a number of values, matrix of values etc. for $\beta$ may be calculated in a manner analogous to that used to calculate $\alpha$.

The corresponding value $g_a$ of the goal function g for the adjusted values for the volume and velocity, $vol_a$ and $vel_a$, may then be determined as follows:

$$g_a = \left(\frac{vel_T - vel_a}{vel^*}\right)^2 + \left(\frac{vol_T - vol_a}{vol^*}\right)^2$$

Substituting the above expressions for $vol_a$ and $vel_a$ gives the following relation:

$$g_a = \left(\frac{vel_T - (vel_r + \alpha U^a)}{vel^*}\right)^2 + \left(\frac{vol_T - (vol_r + \beta U^a)}{vol^*}\right)^2$$

It should be noted that the corresponding value $g_T$ of the goal function for the targeted values $vol_T$ and $vel_T$ is zero. Thus, to identify the value $U^a$ that minimizes the difference between $g_a$ and $g_T$, it is simply necessary to identify the value $U^a$ that minimizes the value of $g_a$.

This may be accomplished by differentiating the above expression for $g_a$ with respect to $U^a$ and setting the resulting expression to be equal to zero. This approach is considered suitable at least because for typical head designs it is very unlikely that there exists a value of $U^a$ that results in the value of $g_a$ being zero.

Rearranging the resulting equation gives the following expression for $U^a$:

$$U^a = \frac{\alpha \frac{vel_T - vel_r}{vel^{*2}} + \beta \frac{vol_T - vol_r}{vol^{*2}}}{\left(\frac{\alpha}{vel^*}\right)^2 + \left(\frac{\beta}{vol^*}\right)^2}$$

In the case where the characteristic value vel* is defined as $vel_T - vel_r$, and the characteristic value vol* is defined as $vol_T - vol_r$, the expression reduces to:

$$U^a = \frac{a + b}{a^2 + b^2}$$

where $a = \frac{\alpha}{vel_T - vel_{r_T}}$ and $b = \frac{\beta}{vol_T - vol_{r_T}}$.

Figure 11:
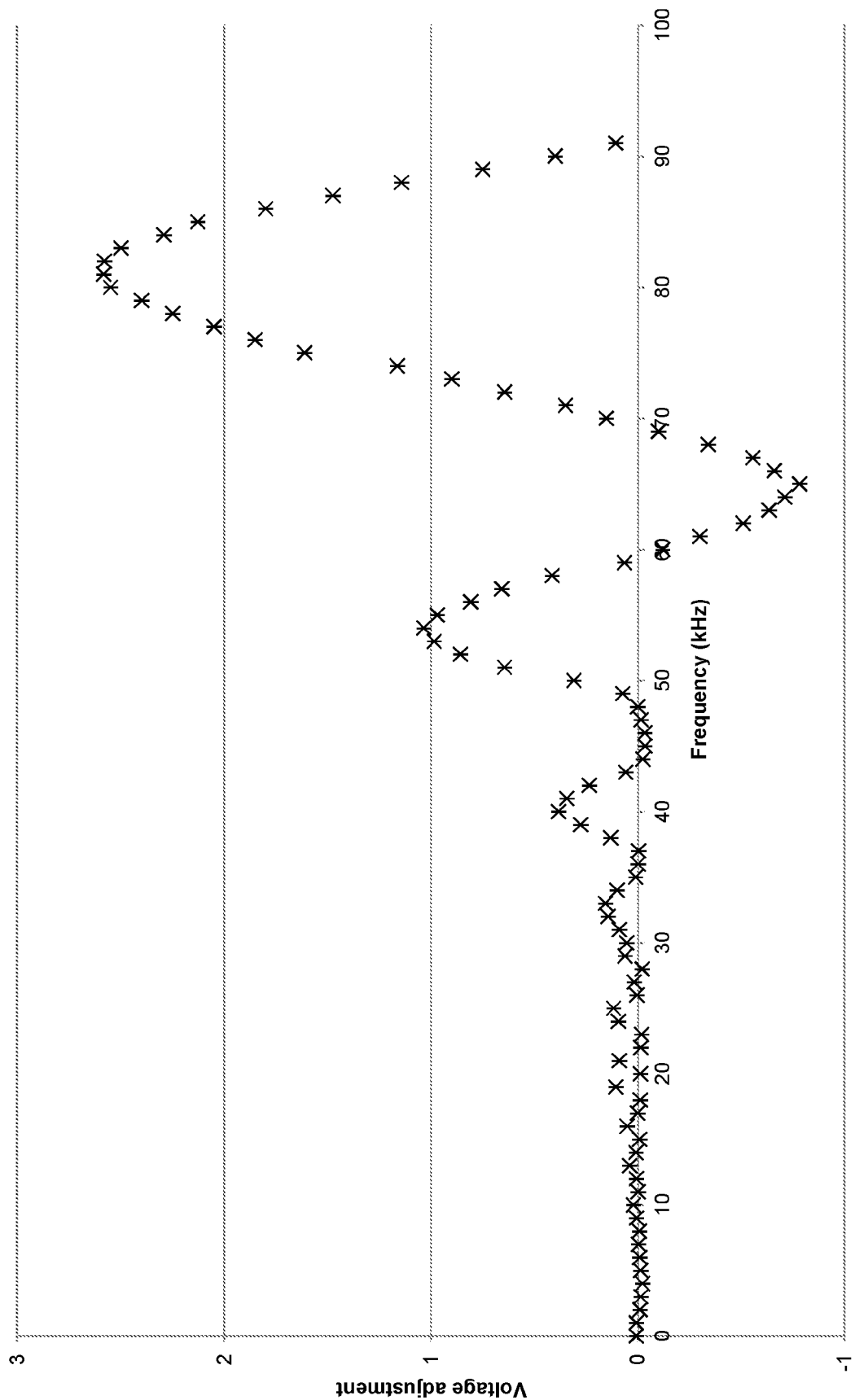
FIG. 11 plots the adjustment values determined using the process illustrated by FIG. 10.
Figure 12:
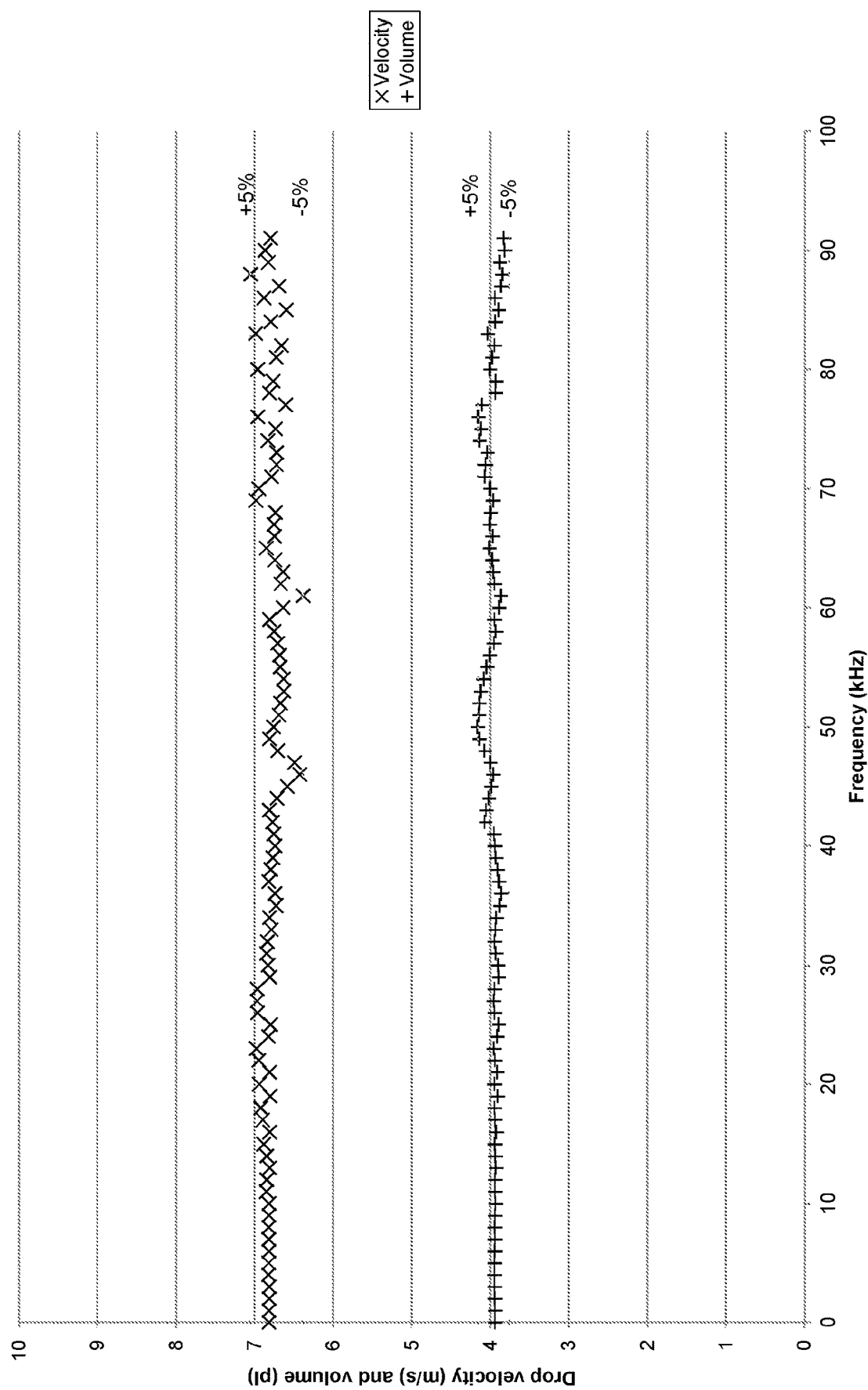
FIG. 12 displays plots of response curves for a head following dynamic adjustment using the adjustment values plotted in FIG. 11.

In one experiment, adjustment values $U^a$ were calculated according to such an approach, using the test data illustrated in FIG. 10. In this experiment, the characteristic value vel* was defined as $vel_T - vel_r$, while the characteristic value vol* was defined as $vol_T - vol_r$ (which may be understood as an example of the characteristic values vel* and vol* varying with frequency). The low frequency values of volume and velocity were used as the targeted values. The same droplet deposition head was then operated using the thus-determined voltage adjustment values $U^a$ which are illustrated in FIG. 11. The volume and voltage response curves for the head, dynamically adjusted with such adjustment values, are shown in FIG. 12. As may be seen, each response curve is substantially parallel to the x-axis. Moreover, most of the values of both the velocity and volume lie within the desired tolerance range of +/−5% of the targeted velocity and volume values (the tolerance range being indicated by dashed lines in FIG. 12).

Figure 13:
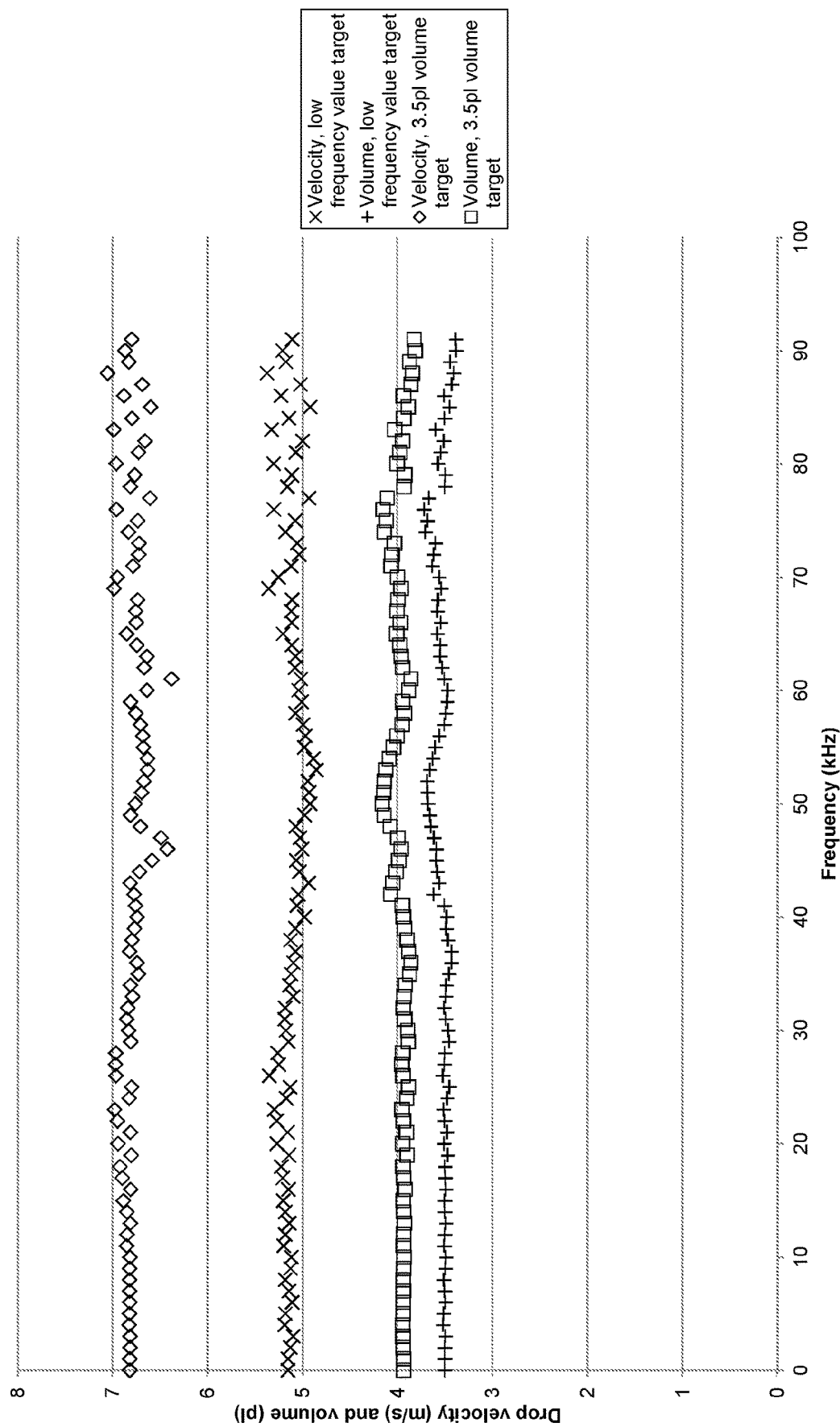
FIG. 13 displays plots of two sets of response curves for a head following dynamic adjustment with respective sets of adjustment values determined using the process illustrated by FIG. 10, each based on respective targeted values of droplet volume and velocity.

FIG. 13 illustrates the volume and velocity response curves from the experiment of FIG. 12, where the low frequency values of volume and velocity were used as the targeted values, and volume and velocity response curves from a further experiment, where a lower value of 3.5 pl was used as the targeted volume. As discussed further above, the targeted droplet velocity and volume values, $vel_T$, $vol_T$, are approximately related such that:

$$\frac{vel_T - vel_0}{\alpha} = \frac{vol_T - vol_0}{\beta}$$

Therefore, a suitable targeted velocity corresponding to a targeted volume value of 3.5 pl was calculated; the value derived was 5.2 m/s. As may be seen from FIG. 13, all four response curves are substantially parallel to the x-axis. Thus, the dynamic adjustment approach is effective with different targeted velocity and volume values.

In related goal functions, weighting coefficients could be applied to x and y. This may, for example, enable the relative range of the scatter for the velocities and volumes to be altered.

In such cases, the goal function may be defined as:

$$g(vol, vel) = Ax^2 + y^2.$$

Thus, the goal function discussed above with reference to FIGS. 11 to 13 may be seen as a special case (where A=1) of this more general goal function.

As before, the values $U^a$ that minimize the difference between $g(vol_a, vel_a)$ and $g(vol_T, vel_T)$ may be found by differentiating the expression for $g(vol_a, vel_a)$ with respect to $U^a$ and setting the resulting expression to be equal to zero. Rearranging the resulting equation gives the following expression for $U^a$.

$$U^a = \frac{A\alpha \frac{vel_T - vel_r}{vel^{*2}} + \beta \frac{vol_T - vol_r}{vol^{*2}}}{A\left(\frac{\alpha}{vel^*}\right)^2 + \left(\frac{\beta}{vol^*}\right)^2}$$

In the case where the characteristic value vel* is defined as $vel_T - vel_r$, and the characteristic value vol* is defined as $vol_T - vol_r$, the expression reduces to:

$$U^a = \frac{Aa + b}{Aa^2 + b^2}$$

Figure 14:
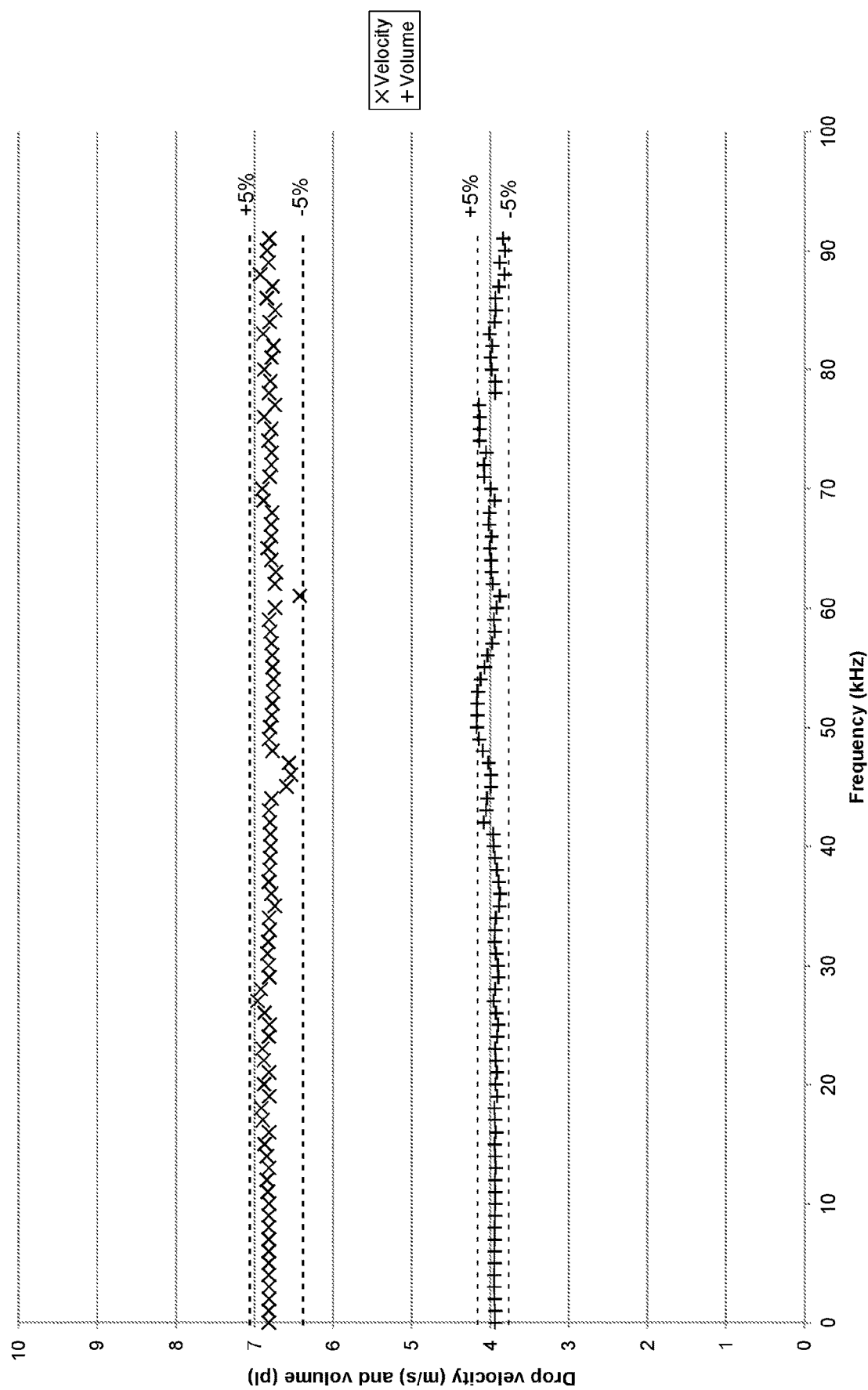
FIG. 14 displays plots of response curves for a head following dynamic adjustment using adjustment values determined using a weighted version of the process illustrated by FIG. 10.

In a further experiment, adjustment values were calculated using such a goal function, specifically with A=4, and with the same test data as illustrated in FIG. 10. The volume and velocity response curves for the head, dynamically adjusted with such adjustment values, are shown in FIG. 14. As may be seen from FIG. 14, each response curve is again substantially parallel to the x-axis. As compared with FIG. 12, the spread in velocity values is reduced; this is considered to be a result of the greater weighting of x—and therefore velocity—within the goal function.

Thus, the value of A may be altered depending on which of volume and velocity it is more important to control: if volume is more important, then A may be greater than 1; if velocity is more important, then A may be less than 1.

Furthermore, rather than the goal function involving summing the squares of x and y, it might instead involve summing their magnitudes, |x| and |y|. In such a case, the appropriate adjustment values $U^a$ for the voltage may be calculated using a somewhat similar approach to that described above.

Momentum and Energy Functions

Other goal functions may correspond to derived physical quantities and, more particularly, to derived physical quantities that may be expected to be conserved within physical systems generally, in other words, derived physical quantities for which there is a conservation law. Such derived physical quantities include, for example, energy and momentum.

Such quantities have been observed to often be less sensitive to varying meniscus position. As discussed further above, meniscus position generally varies with jetting frequency, which is thought to in turn lead to sloped trend lines in the volume and velocity frequency response curves. Such sloped trend lines may complicate the calculation of correction voltages, for instance by making curve fitting more complex. By contrast, the trend lines for the response curves for momentum and energy are generally found to have slopes close to zero. This is believed to be a result of the momentum and energy of the applied pressure pulse being substantially constant for all frequencies.

Thus, in one example, the goal function g may be a "momentum" function, with $g(vol, vel) = vol \cdot vel$. This expression may be understood to be analogous to the momentum of each droplet ejected, in arbitrary units, where the density ρ for the fluid is equal to 1.

Similarly, in another example, the function g may be an "energy" function and thus $g(vol, vel) = vol \cdot vel^2$. This expression may be understood to be analogous to the energy of each droplet ejected (again, in arbitrary units, where the density ρ for the fluid is equal to 1).

Since we seek the adjustment value that minimizes the difference between the value $g_a$ of the function g when calculated using $vol_a$ and $vel_a$; and the value $g_T$ of the same function when calculated using the targeted droplet volume and velocity values, $vol_T$, $vel_T$, values for $vol_a$ and $vel_a$ must be obtained.

As noted above, this may be accomplished by analysing the differences between the data for different test waveforms. Specifically, this may, for example be accomplished by interpolation between the known adjusted volume and velocity values and/or by determining the sensitivity of each of volume and velocity to changes in the waveform parameter adjustment value. For instance, one or more sensitivity values may be calculated for each of volume and velocity; one sensitivity value could be calculated for all frequencies, or respective sensitivity values could be calculated either for bands of frequencies or for individual frequencies.

In the following illustrative example, sensitivity values are calculated for each of volume and velocity.

In the following illustrative example, the waveform parameter 10 is the pulse amplitude 10a for a basic drive waveform 100, which is applied to produce the droplets whose volumes and velocities are recorded (or in other words a test voltage $U^r$, where the superscript r denotes that this is the voltage at which the droplet volumes and velocities are recorded). Accordingly, the adjustment value corresponds in this particular example to a change, or adjustment, $U^a$ in voltage (where the superscript a denotes that this is an adjustment to the voltage, this adjustment being applied to the voltage of the basic drive waveform 100, that is, $U^r$). However, the adoption of pulse amplitude 10*a* as the waveform parameter 10 is by no means essential: any suitable waveform parameter 10 could be used instead.

Expressions for estimates of $vol_a$ and $vel_a$, the droplet volume and velocity corresponding to the adjustment value $U^a$, will now be derived.

Specifically, an estimate for the resulting adjusted value for the volume, $vel_a$, may be calculated using the following relation, which was discussed with reference to "scaled difference" functions above:

$$vel_a = vel_r + \alpha U^a$$

where $vel_r$ is the recorded value of the velocity at the frequency in question and $\alpha$ is the sensitivity of the velocity to changes in the voltage U. A value, or a number of values, matrix of values etc. for $\alpha$ may be calculated in a similar manner to that described above with reference to "scaled difference" functions.

An estimate for the resulting adjusted value for the volume, $vol_a$, may be calculated using the following, similar relation, which was also discussed with reference to "scaled difference" functions above:

$$vol_a = vol_r + \beta U^a$$

where $vol_r$ is the recorded value of the velocity at the frequency in question and $\beta$ is the sensitivity of the velocity to changes in the voltage, U. A value, or a number of values, matrix of values etc. for $\beta$ may be calculated in an analogous manner to $\alpha$.

The value $g_a$ of the goal function g for the adjusted values for the volume and velocity, $vol_a$ and $vel_a$, may then be determined using the following relation:

$$g_a = (vel_r + \alpha U^a)(vol_r + \beta U^a)$$

The corresponding value $g_T$ of the goal function, g, for the targeted values, $vol_T$ and $vel_T$, may be determined using the following relation:

$$g_T = vel_T \cdot vol_T$$

As discussed above, we seek the adjustment value $U^a$ that minimizes the difference between $g_a$ and $g_T$. $U^a$ could be derived in a similar manner to that described above in relation to "scaled difference" functions. Specifically, the expression for $g_T - g_a$ may be differentiated with respect to $U^a$, with the resulting expression set to zero and solved for the value of $U^a$. In the following example, however, the expression for $g_T - g_a$ itself is set to zero and then solved. Thus:

$$vel_T \cdot vol_T - (vel_r + \alpha U^a)(vol_r + \beta U^a) = 0$$

which may be rearranged to give:

$$U^{a^2}(\alpha\beta) + U^a(\alpha \cdot vol_r + \beta \cdot vol_r) + (vel_r \cdot vol_r - vel_T \cdot vol_T) = 0$$

As the reader will notice, this is a quadratic in $U^a$, which may be solved using conventional methods to give a value for $U^a$.

Figure 15:
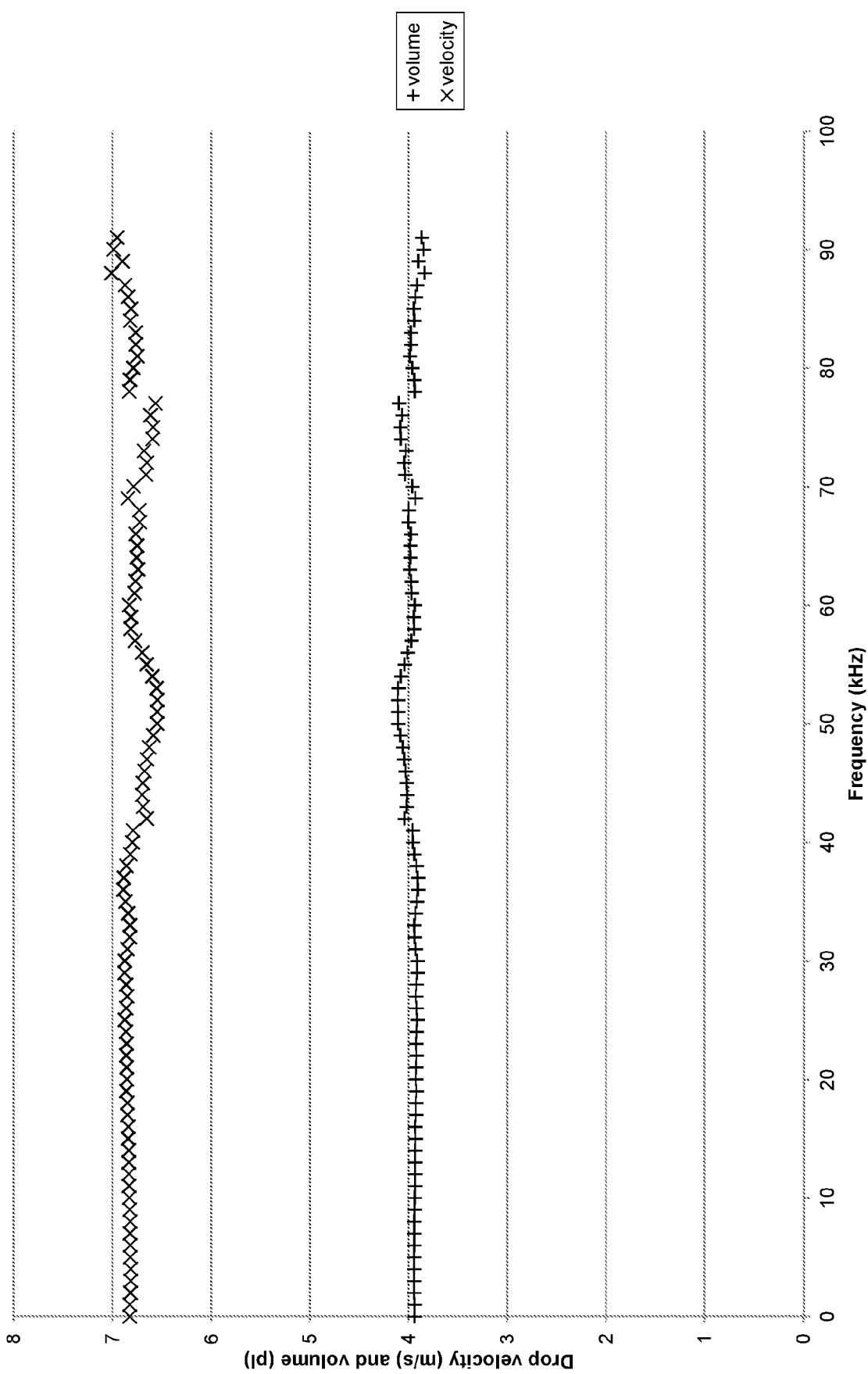
FIG. 15 displays plots of response curves for a head following dynamic adjustment using adjustment values determined using a "momentum" targeting approach.

In an experiment, voltage adjustments values were calculated using this approach. The volume and voltage response curves for the head, dynamically adjusted with such voltage adjustment values, are shown in FIG. 15. As may be seen, each response curve is substantially parallel to the x-axis.

In an optional modification, the sensitivity values $\alpha$ and $\beta$ may be altered, for example so as to enable the relative range of the scatter for the velocities and volumes to be altered.

While in a number of the examples described above the sensitivities of, respectively, volume and velocity to changes in the waveform parameter were measured, in the next example the sensitivity of the goal function g(vol, vel) is determined instead.

In the following specific example, the goal function g is a "momentum" function and thus $g(vol, vel) = vol \cdot vel$. However, a similar approach may be adopted with other functions. For instance, the function g may instead be an "energy" function and thus $g(vol, vel) = vol \cdot vel^2$.

According to this illustrative example, a "momentum" variable p is defined as $p = vol \cdot vel$ and thus $g(vol, vel) = p$.

As discussed above, test data is collected by operating a test droplet deposition head in a number of tests, each using a different one of a set of test waveforms. As before, the test waveforms each correspond to a different value for a waveform parameter, such as the pulse width, pulse amplitude, slew rate of a basic drive waveform, the width or amplitude of a portion removed from the basic drive waveform, and the like.

Each test is carried out over the same frequency range (for example, from about 1 kHz to about 90 kHz), with the volume and velocity of the ejected droplets being recorded for the same test frequencies within this frequency range, so as to build up a series of volume and velocity response curves corresponding to the series of test waveforms. The test frequencies may be distributed over the test range in an evenly-spaced manner; for instance, successive frequencies might increase by 1 kHz.

The resulting recorded volume and velocity values may then be converted to momentum values, using the relation $p = vol \cdot vel$. The recorded volume and velocity values may be processed, for example by smoothing, filtering, fitting to a curve etc. either before or after being converted to momentum values.

In this illustrative example, the waveform parameter is the pulse amplitude for a drive waveform. Therefore, a series of tests are carried out where the head is operated with an adjusted drive waveform (a test waveform) having a corresponding test voltage $U^r$ (where the superscript r denotes that this is the voltage applied to produce the droplets whose volumes and velocities are recorded). Nonetheless, it will be apparent that any suitable waveform parameter could be used instead.

Let $p_{i,j}$ be an m×n matrix of drop momenta. As shown in the following matrix, indices i and j point, respectively, to the test voltages $U_i^r$ (rows) and jetting frequencies $f_j$ (columns) that were used when recording the test data (that is, without adjustment, or "trimming", of the drive waveforms).

$$p_{i,j}^r = U_i^r \downarrow \overset{f_j \rightarrow}{\begin{pmatrix} p_{1,1}^r & \cdots & p_{1,n}^r \\ \vdots & \ddots & \vdots \\ p_{m,1}^r & \cdots & p_{m,n}^r \end{pmatrix}}$$

We seek a row of adjustment values $U^a_{\ j}$, where each value corresponds to the adjustment in the waveform parameter U that is expected to result in the momentum at frequency $f_j$ being equal to the targeted momentum value $p^T$, which corresponds to targeted values of volume and velocity. As noted above, these may, for example, be volume and velocity values characteristic of a certain portion of the test range. This might, for instance, be a low frequency portion of the test range, such as a portion below subharmonic oscillations. Hence, $p^T$ might, for example, be equal to $p_{i,j=1}^{\ r}$, or $p_{i,j=2}^{\ r}$, or $p_{i,j=3}^{\ r}$ etc.

Each such value for $U^a_j$ may be determined using the following approach.

Firstly, for each frequency $f_j$, identify the recorded momentum value $p^r_{k,j}$ which is closest to the targeted momentum value $p^T$. This recorded momentum value $p^r_{k,j}$ corresponds to a drive voltage $U^r_k$.

Then, calculate the sensitivity $\gamma_{k,j}$ or this drive voltage $U^r_k$ and frequency $f_j$, for example using the following relation:

$$\gamma_{k,j} = \frac{p^r_{k+1,j} - p^r_{k-1,j}}{U^r_{k+1} - U^r_{k-1}}$$

Next, recognise that the value of the adjusted momentum $p^a_j$ at frequency $f_j$, following the adjustment of the waveform parameter by $U^a_j$, may be expressed using the following relation:

$$p^a_j = p^r_{i=k,j} + \gamma_{i=k,j} \cdot U^a_j$$

Because the goal function g is defined such that g(vol, vel)=p, this expression represents the value $g_a$ of the goal function when calculated for the expected values of velocity (vel$^a$) and volume (vol$^a$) following adjustment. Thus:

$$g_a = p^r_{i=k,j} + \gamma_{i=k,j} \cdot U^a_j$$

The value $g_T$ of the goal function when calculated for the targeted values of velocity (vol$^T$) and volume (vel$^T$) may be simply expressed in terms of the targeted value for momentum, $p^T$:

$$g_T = p^T$$

As discussed above, we seek the value of the waveform parameter $U^a_j$ that minimises the difference between the value of the goal function when calculated using the values that are expected to result from adjustment (in this case corresponding to $p^a_j$) and the targeted values (in this case corresponding to $p^T$). This may be derived by setting the expression for $g_T - g_a$ equal to zero and then solving the resulting equation. Thus:

$$0 = p^T - (p^r_{i=k,j} + \gamma_{i=k,j} \cdot U^a_j)$$

Rearranging for $U^a_j$ gives:

$$U^a_j = \frac{1}{\gamma_{i=k,j}} (p^T - p^r_{i=k,j})$$

and substituting the expression for $\gamma_{i,j}$ from above gives:

$$U^a_j = \frac{p^T - p^r_{i=k,j}}{p^r_{i=k+1,j} - p^r_{i=k-1,j}} (U^r_{i=k+1} - U^r_{i=k-1})$$

The reader will recall that this formula is calculated based on the test drive voltage $U^r_k$ that corresponds to the recorded momentum value $p^r_{k,j}$ closest to the targeted momentum value $p^T$. Of course, the recorded momentum value $p^r_{k,j}$ that is closest to the targeted momentum value $p^T$ will tend to vary depending on the frequency (given that a starting assumption is that there is significant variation in the recorded momentum value $p^r_{k,j}$ with frequency). Therefore, as a next step, the adjustment values $U^a_j$ at the various frequencies may be rebased so as to provide adjustment values based on the same test voltage $U^r_m$. The corresponding rebased adjustment value $U^{a*}_j$ may be calculated using the following relation:

$$U^{a*}_j = U^a_j + U^r_{i=k} - U^r_m$$

Typically it will be these rebased adjustment values that are used with the head that is sent to the user (the initial, unrebased adjustment values could also be used, but the apparatus would have to have knowledge of the test voltages that each of these unrebased adjustment values is based on).

It should be noted that, in the approaches described above, the sensitivities $\gamma_{i,j}$ could instead be calculated using the relation:

$$\gamma_{i,j} = \frac{p_{i+1,j} - p_{i,j}}{U^r_{i+1} - U^r_i}$$

or the relation:

$$\gamma_{i,j} = \frac{p_{i,j} - p_{i-1,j}}{U^r_i - U^r_{i-1}}$$

Either of these two relations enables the sensitivities to be calculated with test data for only two voltages (or, more generally, two test waveforms).

In an alternative, but similar approach, a row of adjustment values, $U^a_j$, could be determined by interpolation and/or extrapolation of the matrix of test result values $p_{i,j}$ and the corresponding values of the recorded waveform parameter $U^r_i$.

For instance, each value of the row of adjustment values $U^a_j$ could be determined by interpolation and/or extrapolation of the corresponding column of momentum values within the matrix of test results. For instance, for frequency $f_k$ there is a corresponding column of momentum values $p_{i,j=k}$, where each of these momentum values within the column being associated with a corresponding value of the waveform parameter $U^r_i$ for which recordings were carried out. Therefore, by interpolation and/or extrapolation of the column of momentum values $p_{i,j=k}$, the value of the waveform parameter that is expected to exactly correspond to the targeted value of momentum $p^T$ may be determined.

In either case, a row of adjustment values $U^a_j$ corresponding to the targeted value of momentum, $p^T$ may be stored on the head, or on a component associated with the head, for reference during later operation (as will be discussed in more detail below).

In some cases, it may be desirable to give the user of the head the ability to operate the head in several modes. Each of these modes may correspond to a respective targeted value of momentum. Accordingly, there may be stored a matrix of adjustment values, where each row in the matrix corresponds to a different mode and, therefore, to a respective targeted momentum value.

The head, or the droplet deposition apparatus of which the head forms a part, then may be configured so that the user has fine control over the volume or the velocity of the droplets ejected by the head. In such a case, the head or a component connected to the head may store the matrix of test data (or an interpolated or extrapolated version thereof) so that the drive circuitry of the head may derive a set of adjustment values corresponding to the user-selected volume or velocity.

While the examples discussed in detail above have been based on "momentum" functions, procedures that determine adjustment values from "energy" functions will operate in an analogous manner.

Implementation of the Adjustment Values in a Droplet Deposition Apparatus

Once a set of adjustment values has been determined using one of the procedures described above, adjustment data representing these adjustment values may be stored on data storage.

Such data storage may take a wide variety of forms, whether ROM, RAM or otherwise. The data storage may be a single, dedicated integrated circuit, may be implemented on an integrated circuit with additional functions, or, indeed, may be provided by a number of integrated circuits, some of which may have additional functions.

In terms of the format of the adjustment data, such data may simply include the adjustment values (e.g. voltage adjustments) that were determined using one of the approaches described above, together with their associated frequency values. These pairs of values could, for instance, be stored in a lookup table stored on the data storage, as will be described in further detail below.

However, the adjustment data may represent the adjustment values and their associated frequency values in other ways. For instance, the adjustment data might include values for a number of parameters that define a fitted adjustment curve. The values of the parameters can be determined in such a way as to fit the adjustment curve to the adjustment values that have been determined by processing the test data. In this way, the values for the parameters of the fitted adjustment curve represent the adjustment values and their associated frequency values.

Such fitting may address noise or scatter in the adjusted values that may, for example, result from measurement errors or transient phenomena in the original test data. Such noise or scatter may arise even where the test data has been fitted to a curve prior to processing; for instance, it may result from the calculation of the sensitivity values or from interpolation between the different fitted curves.

As discussed in the "selection of a suitable waveform parameter" section above, the adjustment values correspond to amounts by which the chosen waveform parameter of the basic drive waveform is adjusted. Thus, each adjustment value may be considered as defining a corresponding adjusted drive waveform. Once the adjustment values have been determined, it may (depending, for instance, upon the particular waveform parameter that has been chosen and the specific electronics of the apparatus) no longer be necessary to define these adjusted drive waveforms with reference to the basic drive waveform. Accordingly, the adjustment data might include values for parameters (such as pulse amplitude, pulse width, slew rate etc.) that provide a self-contained definition of each of these adjusted drive waveforms.

In terms of physical location, the data storage may be provided on-board or off-board the head. Thus, rather than the data storage forming part of the droplet deposition head provided to the user, it may be provided by a data processing component, which is connectable to the head, and which forms part of a larger droplet deposition apparatus that includes the head (and which typically includes additional, like heads). The latter approach may, in consequence, enable relatively simple drive circuitry to be provided on-board the head. Such simpler drive circuitry may lead to reduced heat generation within the head, since the more intensive data processing involving the adjustment values may be carried out by the data processing component, which may be physically spaced apart from the head, thus making thermal control of the head more straightforward. In addition, or instead, such simpler drive circuitry for the head may be cheaper.

Such data processing may be particularly intensive in applications such as web presses and cut sheet presses, which have demanding data rates. The resolution and receiving medium speed are both high, for example 600 dpi and 4 m/s (800 fpm or 160 ips) respectively with 3 grey levels. Often two sets of heads are needed in the down web direction to fill all the pixels in the direction of movement of the receiving medium.

Another demanding application is wide format graphics where a scanning printhead moving as fast as 1.7 m/s (70 inch/sec) jets UV-curable, solvent, or aqueous inks with multiple grey levels.

Figure 16:
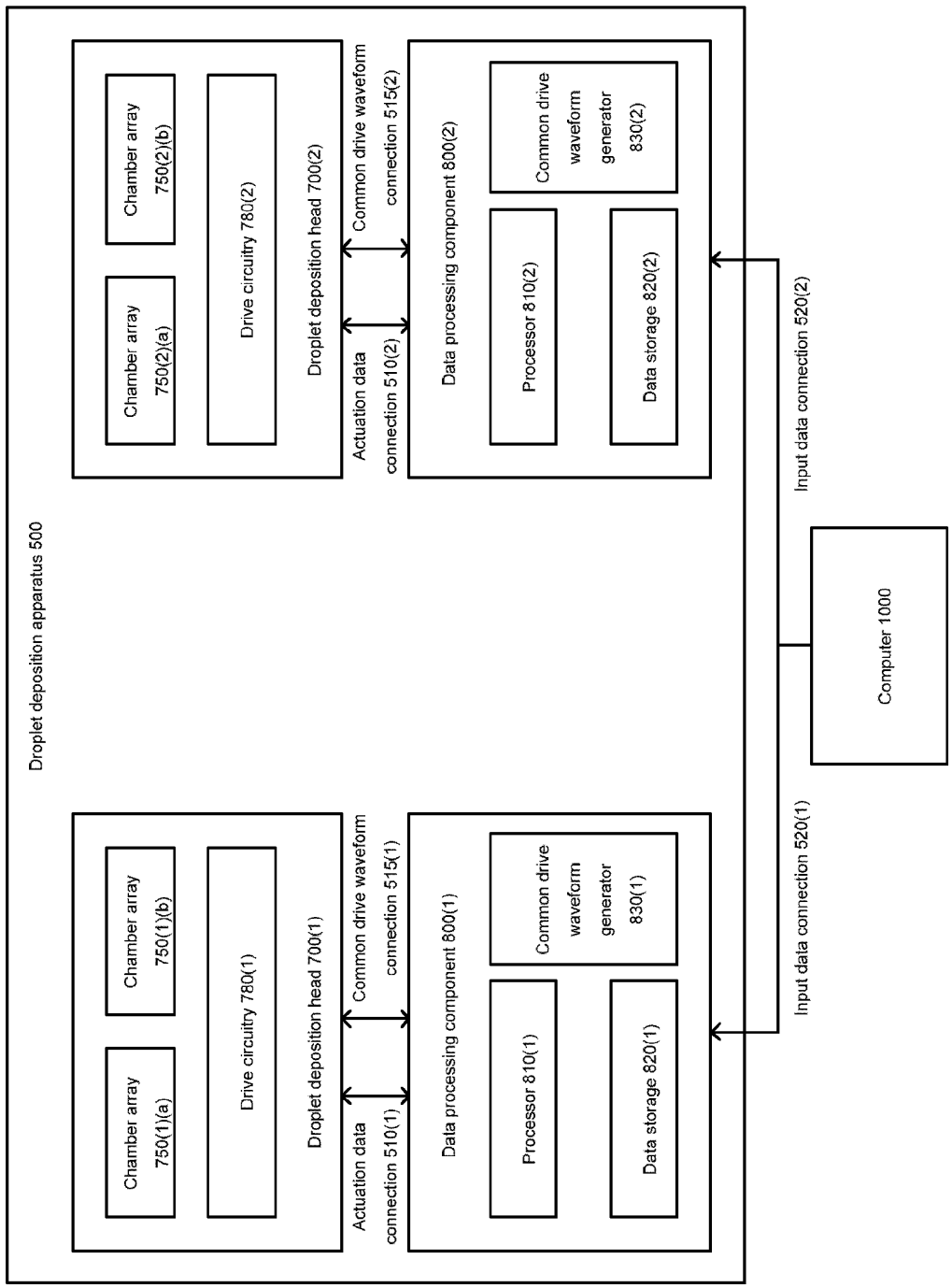
FIG. 16 is a block diagram of an example of a droplet deposition apparatus that includes a number droplet deposition heads that are dynamically adjusted during use.

FIG. 16 is a block diagram of an example of a droplet deposition apparatus 500 comprising a number of such data processing components 800(1), 800(2). As may be seen from the drawing, each droplet deposition head 700(1), 700(2) is provided with and connected to a respective data processing component 800(1), 800(2) by means of a corresponding actuation data connection 510(1), 510(2) and a corresponding common drive waveform connection, 515(1),515(2). The apparatus is scalable, so that although only two heads 700(1), 700(2) are illustrated in FIG. 16 any suitable number could be provided.

FIG. 16 shows schematically how each head 700(1), 700(2) includes at least one array of fluid chambers 750 with each fluid chamber within the arrays having associated with it a respective actuator element and nozzle. The possibility of providing multiple arrays of fluid chambers is illustrated in the drawing by showing a second array of fluid chambers 750(1)(b), 750(2) b) for each head 700(1), 700(2) in dashed outline.

In the example shown in FIG. 16, each data processing component 800(1), 800(2) includes a processor 810(1), 810(2), a common drive waveform generator, 830(1),830(2), and dedicated data storage 820(1), 820(2), with adjustment data for the corresponding one of the heads 700(1), 700(2) being stored thereon.

As FIG. 16 shows, each data processing component 800(1), 800(2) may be provided with a respective input data connection 520(1), 520(2) to a source of input data, such as a computer 1000. Each data processing component 800(1), 800(2), using its processor 810(1), 810(2), processes the input data in accordance with the adjustment data stored on its data storage 820(1), 820(2) so as to generate actuation data to be sent to the corresponding one of the heads 700(1), 700(2), via its actuation data connection 510(1), 510(2).

In response to this actuation data, each head 700(1), 700(2) is able to generate, using its drive circuitry 780(1), 780(2), adjusted drive waveforms that are applied to the actuator elements of its array(s) of fluid chambers 750(1)(a)-(b), 750(2)(a)-(b). To this end, the actuation data defines an adjustment value for each actuator element that is to be actuated by such an adjusted drive waveform. Each of these adjustment values is determined using the adjustment data stored on the data storage 820(1), 820(2) based on it being associated with the current operating frequency of the actuator element in question.

Accordingly, it is necessary for the data processing component 800(1), 800(2) to determine the current operating frequency of each actuator element and then generate drive actuation data based on the thus-determined current operating frequency.

The current operating frequency of an actuator element may be determined in any suitable manner; for example, it may be determined based on the time period within which the actuator element has carried out a predetermined number of ejections $N_1$. In the simplest case, $N_1$ may be 1, so that the current operating frequency is simply determined based on the time period since the most recent ejection.

In some implementations this may be achieved simply by examining recent actuation history for that actuator element. Such actuation history will typically define a series of ejection—or non-ejection—events for that actuator element, with each ejection event resulting in a respective separate body of fluid being deposited on the receiving medium (which is the medium onto which the head deposits droplets, such as a sheet of paper, textile, foil, bottle, can, etc.). By contrast, each non-ejection event will result in an empty space on the receiving medium. Generally, such ejection or non-ejection events occur at regular intervals, for instance in response to a synchronisation signal that synchronises the respective ejection events for the chambers of the arrays 750(1)(a)-(b), 750(2)(a)-(b) in the head 700(1), 700(2).

Because ejection or non-ejection events generally occur at a constant frequency, examining the recent actuation data for each actuator element, and particularly by determining the number of non-ejection events since the most recent ejection event, the time period since the most recent ejection is in effect determined (albeit in units of the time period between consecutive ejection or non-ejection events). Thus, the number of non-ejection events may be used as an index for a lookup table containing adjustment values.

Similarly, by determining the number of ejection and non-ejection events since the second, third, fourth etc. most recent ejection, the time period within which the actuator element has carried out two, three, four etc. ejections is determined. Again, the number of such events may be used as the index to a lookup table containing adjustment values.

Indeed, as the time period within which an actuator element has carried out a predetermined number of ejections $N_1$ may take only a limited number of values, it is in general considered to be suitable for use as the index to a lookup table containing adjustment values, regardless of whether the time period is determined by examining the actuation data for the actuator element in question.

In other examples, the current operating frequency of an actuator element may be determined by calculating an average operating frequency for that actuator element over a predetermined time period (e.g. determining the number of actuations $N_2$ that have occurred within a specific time period $t_2$ and calculating $N_2/t_2$).

With the current operating frequency of the actuator element having been determined, for example by any of the approaches described above, the data processing component 800(1), 800(2) determines an adjustment value for each actuator element that is to be actuated in accordance with the input data. Specifically, the adjustment value is that whose associated frequency is substantially equal to the current operating frequency of the actuator element.

Where the adjustment data stored on the data storage 820(1), 820(2) of the data processing component 800(1), 800(2) include the adjustment values together with their associated frequency values, the head may, for example, simply select the adjustment value whose associated adjustment frequency is substantially equal to the current operating frequency of the actuator element (as just determined). For example, if the current operating frequency of the actuator element is determined to be 52 kHz, then the head will identify the adjustment value that was determined for 52 kHz (or the closest frequency for which an adjustment value was determined, e.g. 50 kHz). Thus, if the adjustment data are stored in a lookup table, the current operating frequency of the actuator element may be used as the index for the lookup table.

Where the adjustment data stored on the data storage 820(1), 820(2) of the data processing component 800(1), 800(2) include values for parameters such as pulse amplitude, pulse width, slew rate etc. that define each of a number of adjusted drive waveforms, the data processing component 800(1), 800(2) may identify which set of parameter values is associated with a frequency that is closest to the current operating frequency of the actuator element. That adjusted drive waveform (perhaps with additional adjustments) may then be applied to the actuator element.

The droplet deposition apparatus 500 of FIG. 16 may utilise heads 700(1), 700(2) that are configured so as to perform binary ejection, or may utilise heads that so as to perform greyscale ejection.

In heads that are configured so as to perform binary ejection (hereinafter termed "binary heads"), each actuator element either: ejects a droplet of a predetermined size (which does not vary with the actuation/input data); or does not eject a droplet. In heads that are configured to perform greyscale ejection (hereinafter termed "greyscale heads"), each actuator element is actuated to cause the ejection of multiple sub-droplets (up to a maximum number, M), which merge either at the nozzle or during flight, so as to form a single body of fluid (e.g. a dot, in the case of inkjet printing) on the receiving medium.

In the case where binary heads are used, each data processing component 800(1), 800(2) uses the input data it receives to determine a subset of the actuator elements of the head 700(1), 700(2) to which it is connected that are to be actuated so as to cause the ejection of droplets during the current ejection cycle. Thus, the actuation data may simply define this subset of the actuator elements, together with adjustment values corresponding to each of these actuating elements. Equally, the actuation data could include, for each actuator element within the subset, a complete, self-contained definition of all of the parameters (such as pulse amplitude, pulse width, slew rate etc.) for the adjusted waveform for that actuator element.

Such binary heads may use the received actuation data to identify this subset of actuator elements. Then, in response to the actuation data, the head actuates each actuator element within this subset with a drive waveform that is based on the basic drive waveform, with the chosen waveform parameter being adjusted by the corresponding one of the adjustment values defined in the actuation data stored in the data storage 820(1), 820(2) on the corresponding data processing component 800(1), 800(2).

With greyscale heads, the actuation data may define subsets of actuating elements, where all the members of a subset eject the same number of sub-droplets. For instance, the actuation data may include, for each chamber in the chamber array(s) 750 of the head, a sub-droplet value between 0 and M that indicates the number of sub-droplets that should be ejected from that chamber. Accordingly, these sub-droplet values define the subsets of actuating elements that are to eject 1 sub-droplet, 2 sub-droplets, 3 sub-droplets etc. during the current ejection cycle (it being noted that, depending on the input data, certain of these subsets could be empty, e.g. no actuating elements might eject 2 sub-droplets during a particular ejection cycle). The actuation data also define adjustment values corresponding to the actuating elements in all of these subsets.

With such greyscale heads, multiple sets of adjustment data may be stored on the data storage 820(1), 820(2), each of which corresponds to a respective member of a set of basic drive waveforms. Each member of the set of basic drive waveforms, when applied to one of the actuator elements, causes the ejection of a respective number of sub-droplets of fluid. Thus, there may be a basic drive waveform that causes the ejection of a single sub-droplet (such as, for example, the single pulse basic drive waveform 100 shown in FIG. 7), a basic drive waveform that causes the ejection of two sub-droplets, a basic drive waveform that causes the ejection of three sub-droplets, and so on. Each successive sub-droplet adds generally the same volume of fluid to the droplet, so that the volume of the resulting droplet is essentially linearly variable. Data defining the set of basic drive waveforms may be stored on-board each of the heads 700(1), 700(2), so as to be available to the drive circuitry 780(1), 780(2) of the heads.

With greyscale heads, each of the multiple sets of adjustment data set of adjustment data stored on the data storage 820(1), 820(2) represents a plurality of adjustment values and associated adjustment frequencies for the corresponding one of the set of basic drive waveforms. These adjustment values may be represented within the adjustment data in any of the ways described above; for example, each set of adjustment data could simply include adjustment values together with their associated frequency values, or each set of adjustment data could include values for a number of parameters that define a fitted adjustment curve.

Further, each set of adjustment data may be derived using the testing and test data processing procedures described further above. Accordingly, for each member of the set of basic drive waveforms, each head 700(1), 700(2) may have been tested with a number of corresponding test waveforms that are based on the basic drive waveform in question.

Each data processing component 800(1), 800(2) uses the input data it receives to determine a number of subsets of the actuator elements of the head 700(1), 700(2) to which it is connected, where all of the actuator elements within a subset are to eject the same number of sub-droplets. Accordingly, the actuation data that is then sent from each data processing component 800(1), 800(2) defines which actuator elements belong to which subset. For example, as discussed above, the actuation data may include, for each chamber in the chamber array(s) 750 of the head, a sub-droplet value between 0 and M that indicates the number of sub-droplets that should be ejected from that chamber.

In the droplet deposition apparatus 500 of FIG. 16, adjustment values for each subset of actuator elements are determined by the data processing component 800(1), 800(2) for the head 700(1), 700(2) in question. As explained above, to eject a particular number of sub-droplets, a drive waveform based on a corresponding one of the set of basic drive waveforms should be applied to an actuator element. Accordingly, the adjustment values for the actuator elements within a subset are determined using the set of adjustment data stored on the data storage 820(1), 820(2) associated with the basic drive waveform, which ejects the required number of sub-droplets. As will be discussed in further detail below, the adjustment value determined by the data processing component 800(1), 800(2) may include an additional adjustment beyond that which is determined using the adjustment data stored on the data storage 820(1), 820(2) (and which is therefore based on the testing described above). For instance, such an additional adjustment might be based on the current and/or most recent ejections caused by neighbouring actuator elements.

In any case, the actuation data that is sent from each data processing component 800(1), 800(2) defines these adjustment values in addition to defining which actuator elements belong to which subset.

The heads 700(1), 700(2), and specifically the drive circuitry thereof 780(1), 780(2), may then use the received actuation data to identify the subsets of actuator elements to eject droplets with drive waveforms based on the corresponding members of the set of basic drive waveforms. Then, each head 700(1), 700(2) may then actuate each actuator element within a subset with a drive waveform that is based on the corresponding member of the set of basic drive waveforms, with the chosen waveform parameter being adjusted by the corresponding one of the adjustment values defined in the actuation data.

Regardless of whether binary or greyscale heads are utilised, each droplet deposition head 700(1), 700(2) may, as illustrated in FIG. 16, receive common drive waveforms from a common drive waveform generator 830(1), 830(2) (each of which, in the particular example illustrated in FIG. 16, forms a part of the corresponding data processing component 800(1), 800(2)). Although In the particular example shown in FIG. 16, each head 700(1), 700(2) is provided with a respective common drive waveform generator 830(1), 830(2), any suitable number of common drive waveform generators could be provided for each head.

The common drive waveform generator 830(1), 830(2) for each head 700(1), 700(2) provides common drive waveform signals to that head via the corresponding common drive waveform connection 515(1), 515(2). More particularly, the common drive waveform generator 830(1), 830(2) for each head 700(1), 700(2) may provide a number of different common drive waveforms, for example so that each array 750(a),750(b) within each head can be provided with its own common drive waveform. The drive circuitry 780 on-board each head then adjusts the respective common drive waveform by a corresponding amount for each actuator element, in accordance with the actuation data sent to the head by the corresponding data processing component 800 (1), 800(2), so as to provide an individually adjusted waveform for each actuator element. When each individually adjusted waveform is applied to the corresponding one of the actuator elements, that actuator element causes the ejection of a droplet of fluid through the nozzle of the corresponding chamber.

It should be noted that the common drive waveform need not be the same as the basic drive waveform: whereas the basic drive waveform is a feature of the testing that was carried out on the head, the common drive waveform is an implementation detail that enables a family of drive waveforms based on the basic drive waveform to be generated. For instance, the common drive waveform may be a single pulse (e.g. a trapezoidal or rectangular pulse), with portions of selected sizes being removed from this so as to produce corresponding drive waveforms, whereas the basic drive waveform may be such a single pulse with a portion of a particular size removed from it.

In another, more detailed example relating to a greyscale head: the common drive waveform might include M drive pulses, where M is the maximum number of sub-droplets that the head is configured to eject (and may also include one or more non-drive pulses, such as pre-ejection pulses and/or cancellation pulses). By contrast, each member of the set of basic drive waveforms may include only the number of drive pulses that corresponds to the number of sub-droplets that the basic drive waveform in question is to eject. In such a case, the drive circuitry within the head 780(1), 780(2), in response to actuation data indicating a number n of sub-droplets may apply only a portion of the common drive waveform that includes n—with adjustments being made to these pulses, for example in accordance with the adjustment values sent to the head 700(1), 700(2) by the corresponding data processing component 800(1), 800(2)—so as to generate the n sub-droplet drive waveform.

In droplet deposition apparatus 500 such as that shown in FIG. 16 where the common drive waveform is generated by circuitry located away from the actuator elements of the head, a possible consequence is that a significant proportion of energy dissipation occurs in the CDW generation circuitry (e.g. common drive waveform generators 830(1), 830(2)), rather than, for example, the drive circuitry within the head 780(1), 780(2) (which will generally be close to the actuator elements so as to reduce electrical cross-talk and/or undesired power loss in the traces that connect the drive circuitry to the actuator elements). Because the actuator elements are distant from the CDW generation circuitry, the associated heat of such energy dissipation may not reach the actuator elements, which may make thermal control of the head more straightforward.

While the description above has referred to the drive circuitry 780(1), 780(2) of each head 700(1), 700(2) applying, to appropriate actuator elements, drive waveforms that are based on a basic drive waveforms (or a determined one of a set of basic drive waveforms), with the chosen waveform parameter being adjusted by adjustment values defined in the actuation data, it should be noted that the drive circuitry 780(1), 780(2) in the example of FIG. 16 does not generate such basic drive waveforms as separate entities that are then adjusted. Rather, the adjusted drive waveforms are generated directly by the drive circuitry 780(1), 780(2), in accordance with the actuation data received from the corresponding one of the data processing components 800(1), 800(2).

Of course, in other examples, the drive circuitry for a head may initially generate such basic drive waveforms and then adjust them, based on the actuation data.

The algorithms residing on data processing components 800(1), 800(2) may provide additional functionality and processing of the input data. In particular, the data processing components 800(1), 800(2) may provide resolution adjustment; for instance, such algorithms may increase spatial resolution, while decreasing depth resolution.

In particular arrangements, where the input data received by the data processing component defines an m×n array of values, with each value being an integer between 0 and N, the data processing component may be programmed with an algorithm that converts this m×n array of input values to a p×q array of values, with each value in this converted array being an integer between 0 and M, where M is less than N, but p×q is greater than m×n. The conversion may preserve the aspect ratio of the input data array, so that p/m=q/n.

For example, for greyscale heads, M may correspond to the maximum number of sub-droplets for a droplet; with binary heads, M may simply be equal to 1.

In many cases, N may be significantly greater than M. For instance, in the case where the input data are image data, N may be 255 (corresponding to 256 tone levels for each image pixel), whereas M might be 5, or 7 for a typical greyscale head (or, indeed, 1 for a binary head).

Figure 17:
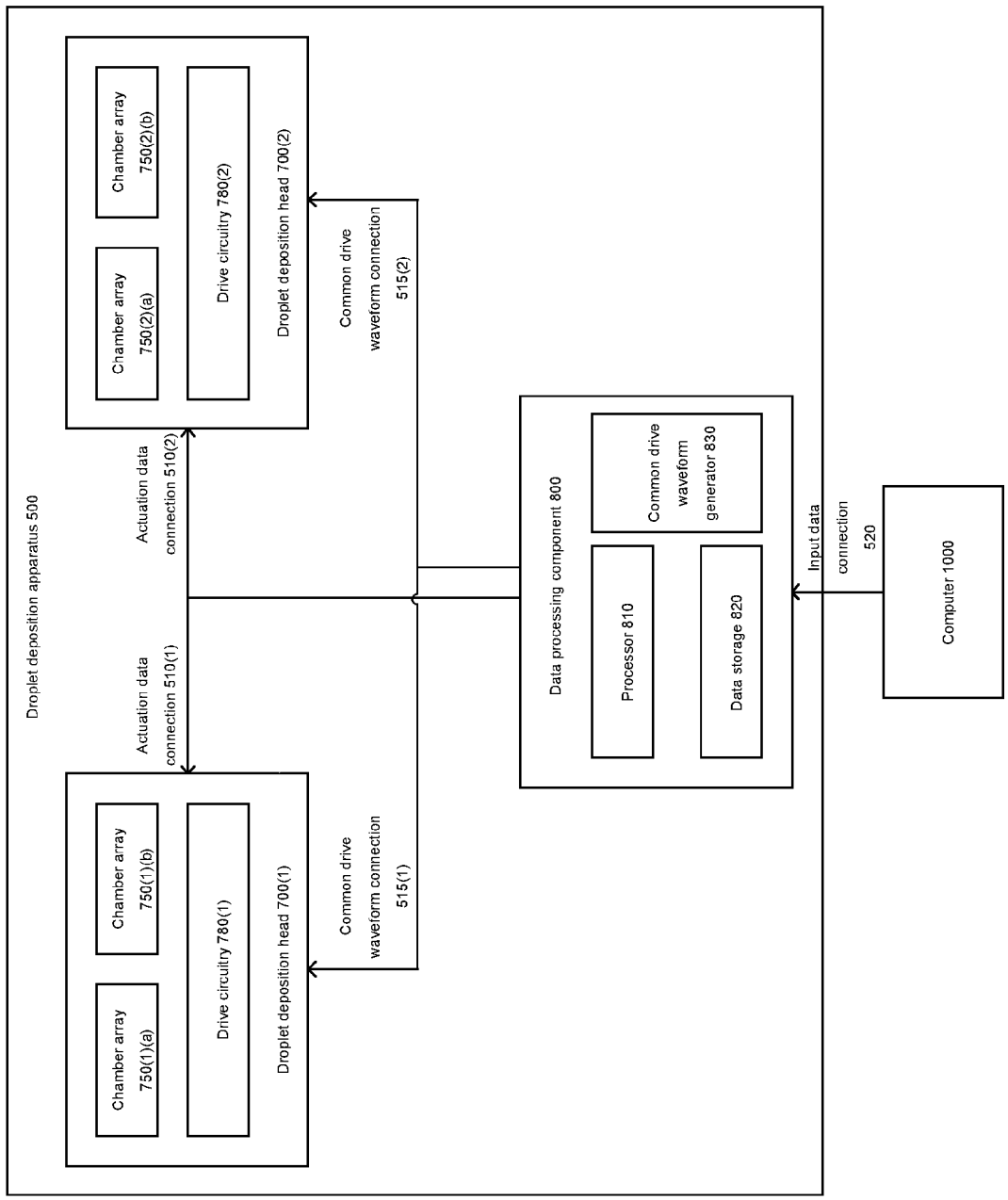
FIG. 17 is a block diagram of a further example of a droplet deposition apparatus that includes a number droplet deposition heads that are dynamically adjusted during use.

While in the droplet deposition apparatus 500 of FIG. 16, each head 700(1), 700(2) is connected to a respective data processing component 800(1), 800(2), this is by no means essential. Accordingly, FIG. 17 illustrates a further example of a droplet deposition apparatus 500, where, in contrast to the example of FIG. 16, a single data processing component 800 is connected to multiple droplet deposition heads 700(1), 700(2) by means of respective actuation data connections 510(1), 510(2) and respective common drive waveform connections 515(1), 515(2). In such a droplet deposition apparatus 500, the data storage 820 on-board the data processing component 800 may have stored thereon a collection of adjustment data, including at least one set of adjustment data for each of the heads 700(1), 700(2) to which it is connected.

While in the droplet deposition apparatus of FIGS. 16 and 17 common drive waveform generators 830 are shown as being part of the data processing components 800, they may alternatively be provided separately from the data processing components 800 and connected to the head 700(1), 700(2) and/or the data processing components 800.

For a number of reasons, it may be appropriate to carry out additional adjustment of the basic drive waveform beyond the specific adjustment value determined in accordance with earlier testing.

Hence, or otherwise, drive waveforms as described above may be further adjusted in terms of the selected waveform parameter by an additional adjustment amount. As will be explained in more detail with reference to FIG. 18, this additional adjustment amount may, for example, be determined based on the current and/or recent ejection caused by neighbouring actuator elements. In addition, or instead, the additional adjustment amount may depend on individual base performance of each actuator element, or on a reduction of performance of each actuator element over the lifetime of the head.

Figure 18:
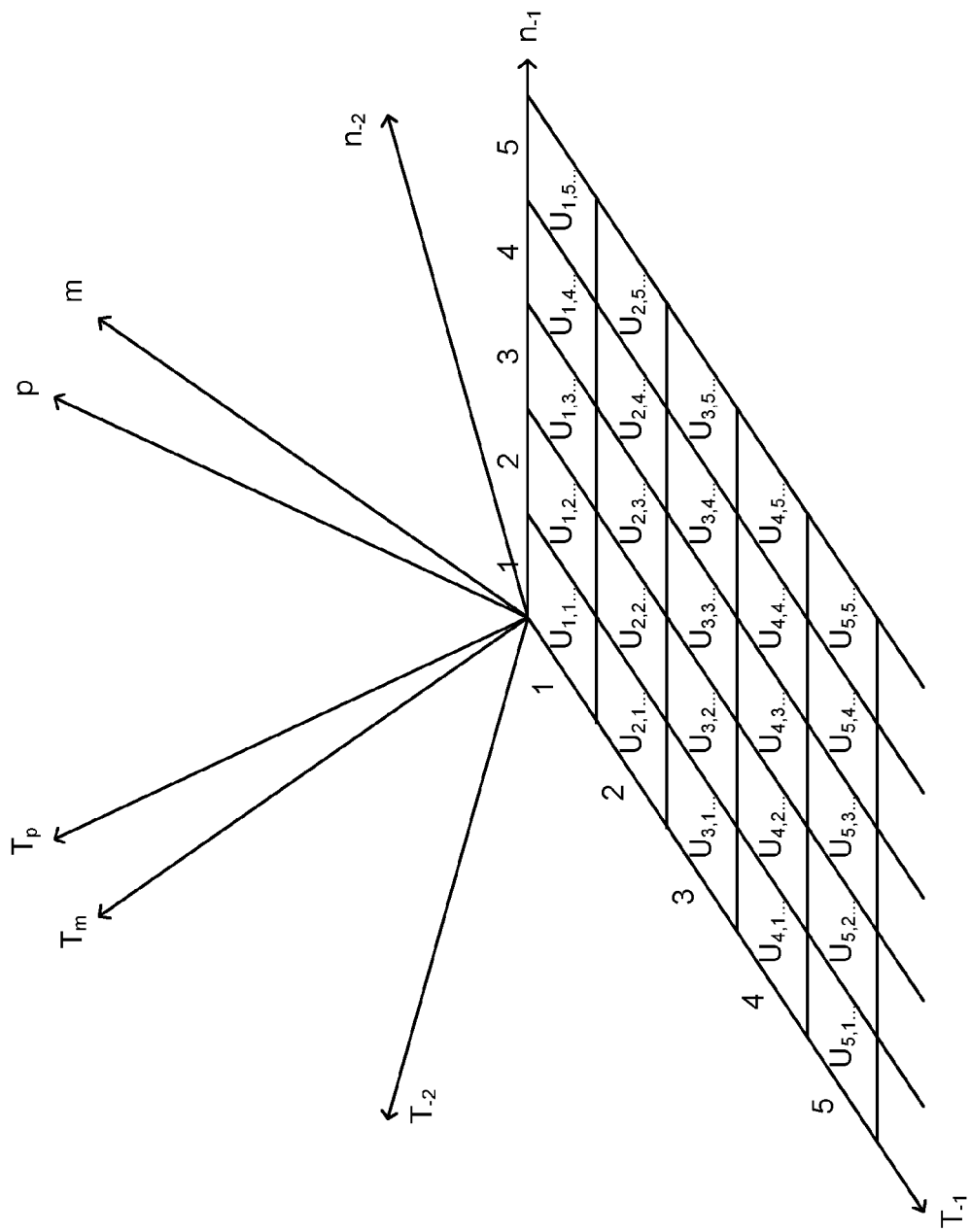
FIG. 18 illustrates a two-dimensional slice through an n-dimensional lookup table of adjustment values for a greyscale head.

FIG. 18 illustrates a two-dimensional slice through an n-dimensional lookup table of adjustment values for a greyscale head. More particularly, the drawing shows the two-dimensional array of adjustment values $U_{i,j}$, where i corresponds to the time period $T_{-1}$ since the most recent ejection normalised in terms of the minimum possible period between ejections (in other words, the number of non-ejection events since the most recent ejection), and where j corresponds to the number of sub-droplets $n_{-1}$ ejected in the most recent ejection. The lookup table shown is specific to the basic drive waveform that ejects a particular number of subject droplets; a similar lookup table may therefore be provided for each of the basic drive waveforms. The dependence upon the number of sub-droplets $n_{-1}$ ejected in the most recent ejection allows for account to be taken of the generally greater residual energy within a chamber following ejection of a larger number of sub-droplets. Thus, the adjustment values for increasing j might, for example, result in an adjusted drive waveform that imparts less energy to the ejected droplet.

As is also shown in FIG. 18, a further, optional axis of the lookup table may correspond to the time period $T_{-2}$ since the second most recent ejection normalised in terms of the minimum possible period between ejections. An associated optional axis corresponds to the number of sub-droplets $n_{-2}$ ejected in the second most recent ejection.

The lookup table could take account of the third, fourth, fifth etc. most recent ejections in like manner with still further axes.

As mentioned briefly above, drive waveforms may be further adjusted based on the current and/or most recent ejections caused by neighbouring actuator elements. Thus, the lookup table of FIG. 18 has two additional, optional axes that allow account to be taken of ejections by the chamber to the left of the current chamber (indicated using the subscript m) and by the chamber to the right indicated using the subscript p). Thus, one axis corresponds to the time period $T_m$ since the most recent ejection by the left-hand chamber m, while another corresponds to the number of sub-droplets ejected in that ejection by the left-hand chamber m. Similarly, one axis corresponds to the time period $T_p$ since the most recent ejection by the right-hand chamber p, while another corresponds to the number of sub-droplets ejected in that ejection by the right-hand chamber m. Unlike $T_{-1}$ above, each of $T_m$ and $T_p$ may take the value zero, indicating that the respective one of left-hand chamber m and right-hand chamber p is ejecting simultaneously with the current chamber.

This is, of course, merely one way in which drive waveforms as described above may be further adjusted in terms of the selected waveform parameter by an additional adjustment amount; other approaches are of course envisaged.

More generally, it should be noted that while in the examples of FIG. 16 and FIG. 17 the adjustment values were stored on data storage provided by the data processing components 800(1), 800(2), the component providing the data storage on which the adjustment data is stored need not provide significant data-processing capabilities. For instance, it might simply provide portions of the adjustment data in response to read requests sent by the head, or by a similar data processing component to that described above, but without data storage having adjustment data stored thereon.

Equally, the adjustment values may simply be stored on data storage on-board the heads, with the data processing components 800 being omitted, and the heads receiving input data directly. In such cases, actuation data as described above may not be generated.

Further, while in the examples of FIG. 16 and FIG. 17 the adjusted drive waveforms are generated on-board the heads 700(1), 700(1) by the drive circuitry 780(1), 780(2), in other examples the algorithms that generate the adjusted drive waveforms may be arranged to occur off-board the heads. In such cases, if the adjustment data is stored in data storage on-board the heads, the off-board circuitry may interrogate the head to extract adjustment values stored in the data storage.

Suitable Constructions of the Droplet Deposition Head

As discussed further above, for some head constructions, the velocity and volume response curves may each have a trend line that is roughly parallel to the frequency axis, for example as illustrated in FIG. 5. The inventors consider that such head constructions may be particularly suited to dynamic adjustment, both with the specific approaches discussed above and more generally.

Nonetheless, the approaches described above for preparing a droplet deposition head for use by a user may be applied to a wide variety of designs of droplet deposition heads. In particular, it is not essential that such approaches be practised on head designs having velocity and volume response curves with trend lines roughly parallel to the frequency axis.

However, where it is desired to provide a head having velocity and volume response curves with trend lines roughly parallel to the frequency axis, the inventors consider an important factor is the design of the fluidic paths in the vicinity of each actuator element. In particular, to include a flow restrictor in the fluid supply connections to each fluid chamber, such as at the inlet to each chamber, may be appropriate. As will be discussed in further detail below, such flow restrictors may assist in balancing the flow through the nozzle during actuation and the refilling of the chamber following actuation (that is, between successive actuations).

An example of a suitable structure for a droplet deposition head that provides a plurality of fluid chambers, whose fluid supply connections include flow restrictors shall now be described with reference to FIGS. 19A and 19B.

Figure 19A:
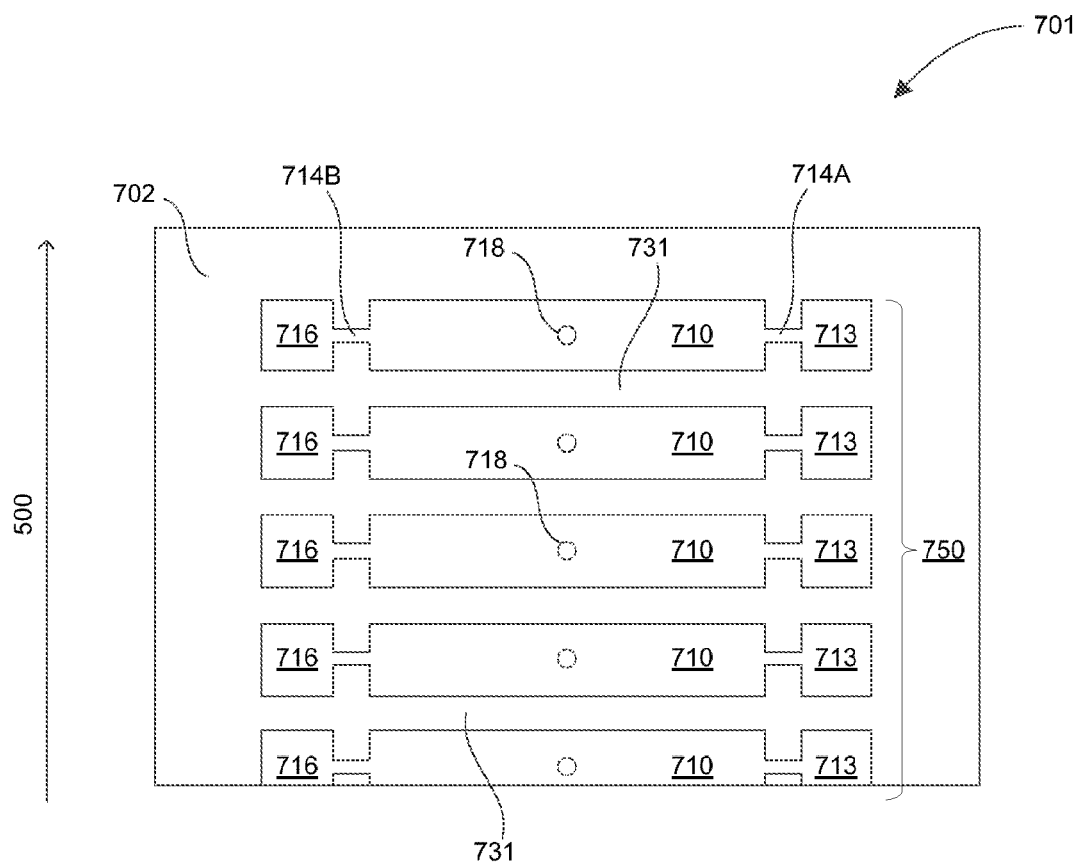
FIG. 19A is a cross-section through an actuator component of a droplet deposition head that may configured for dynamic adjustment during use.

FIG. 19A shows a cross-section through an actuator component 701 of such a droplet deposition head, with the view being taken along the ejection direction. More particularly, as indicated by the dashed line in FIG. 19B, the cross-section show in FIG. 19A is taken in a plane that passes through each of the fluid chambers 710. The fluid chambers 710 are provided in an array 750, which in the particular example illustrated is a linear array 750.

In more detail, the actuator component 701 comprises an array 750 of fluid chambers 710, which are arranged side-by-side in an array direction 500. As will be apparent, each fluid chamber is elongate in a direction perpendicular to the array direction 500. In addition, neighbouring chambers within the array 750 are separated, one from the next, by partition walls 731.

Figure 19B:
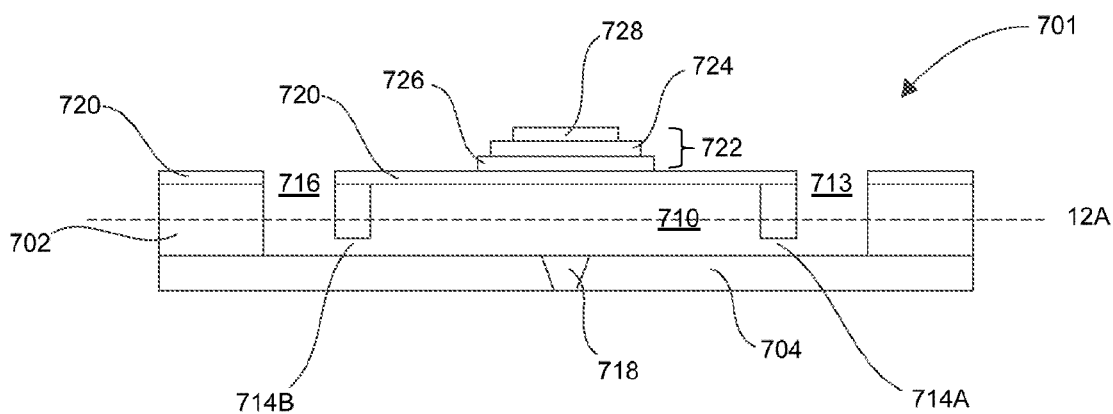
FIG. 19B is a further cross-section through the actuator component of FIG. 19A.

The particular example of an actuator component 701 shown FIGS. 19A and 19B may be described as a die stack and comprises a fluid chamber substrate 702 and a nozzle layer 704, which includes nozzles 718.

As may be seen from FIG. 19A, each of the fluid chambers 710 has a fluidic inlet port 713 in fluidic communication therewith. In the particular example shown in FIG. 19B, the fluidic inlet port 713 is provided at a top surface of the fluidic chamber substrate 702 towards one end of the fluidic chamber 710 along a length thereof.

During use, droplet fluid is supplied to the fluidic chamber 710 from the fluidic inlet port 713.

In the particular example of an actuator component 701 shown FIGS. 19A and 19B a flow restrictor is provided at the inlet to each fluidic chamber 710 by a fluidic inlet channel 714A. Thus, the impedance and/or the inertance of the fluidic inlet channel 714A may be greater than that of the fluid chamber 710. Thus, in the example shown in FIGS. 19A and 19B, the cross-section presented by the fluidic inlet channel 714A to fluid flow is substantially smaller than that presented by the chamber 710. As may also be seen from FIGS. 19A and 19B, the fluidic inlet channel 714A presents a substantially smaller cross-section to the flow of fluid to the chamber 710 as compared with the fluidic inlet port 713.

As is apparent from FIG. 19B, each fluidic inlet channel 714A is provided within the fluidic chamber substrate 702 in fluidic communication with the fluidic chamber 710, and arranged to provide a path for droplet fluid to flow therebetween.

The actuator component 701 shown in FIGS. 19A and 19B further includes a fluidic outlet port 716 in fluidic communication with the fluidic chamber 710, whereby droplet fluid may flow from the fluidic chamber 710 to the fluidic outlet port 716 via a fluidic outlet channel 714B formed in the fluidic chamber substrate 702.

The fluidic outlet channel 714B acts as a flow restrictor at the outlet from each fluid chamber 710. Thus, the impedance and/or the inertance of the fluidic outlet channel 714B may be greater than that of the fluid chamber 710. Thus, in the example shown in FIGS. 19A and 19B, the cross-section presented by the fluidic outlet channel 714B to fluid flow is substantially smaller than that presented by the chamber 710. As may also be seen from FIGS. 19A and 19B, the fluidic outlet channel 714B presents a substantially smaller cross-section to the flow of fluid from the chamber 710 as compared with the fluidic outlet port 716.

As a result of the presence of fluidic inlet channel 714A and fluidic outlet channel 714B, the actuator component 701 shown in FIGS. 19A and 19B includes a respective flow restrictor for each fluid supply connection to the chamber 710.

In the particular construction shown in FIG. 19B, the fluidic outlet port 716 is provided at the top surface of the fluidic chamber substrate 702 towards an end of the fluidic chamber 710 opposite the end towards which the fluidic inlet port 713 is provided.

The actuator component 701 may be arranged to allow droplet fluid to flow continuously from the fluidic inlet port 713 to the fluidic outlet port 716, along the length of the fluidic chamber 710, for example when the head is connected to a fluid supply system. Thus, the actuator component 701 may be considered to operate in a recirculation mode.

In alternative arrangements, the fluidic outlet port 716 may be omitted such that substantially all of the droplet fluid supplied to the fluidic chamber 100 via fluidic inlet port 713 is ejected from the nozzle 718, whereby the head may be considered to operate in a non-recirculation mode. Such a head would include only one fluid supply connection to the chamber 710, with a flow restrictor being provided in this connection by fluidic inlet channel 714A.

The actuator component 701 further includes a nozzle 718 in fluidic communication with the fluidic chamber 710, whereby the nozzle 718 is formed in the nozzle layer 704 using any suitable process e.g. chemical etching, DRIE, laser ablation etc.

Each chamber 710 in the array 750 is provided with an actuator element. In the particular example of an actuator component 701 shown FIGS. 19A and 19B, the actuator elements are thin film piezoceramic actuator elements 722, each comprising electrodes 726 and 728, piezoelectric element 724, and membrane 720. However, as will be discussed in further detail below, any suitable type of actuator or electrode configuration capable of effecting droplet generation may be used.

The fluidic chamber substrate 702 of the actuator component 701 shown in FIGS. 19A and 19B may comprise silicon (Si), and may, for example, be manufactured from a Si wafer, while the associated features, such as the fluidic chamber 710, fluidic inlet/outlet ports 713/716 and fluidic channels 714A, 714B may be formed using any suitable fabrication process, e.g. an etching process, such as deep reactive ion etching (DRIE) or chemical etching.

Additionally or alternatively, the associated features of the fluidic chamber substrate 702 may be formed from an additive process e.g. a chemical vapour deposition (CVD) technique (for example, plasma enhanced CVD (PECVD)), atomic layer deposition (ALD), or the features may be formed using a combination of removal and/or additive processes.

The surfaces of various features of the actuator component 701 may be coated with protective or functional materials, such as, for example, a suitable coating of passivation material or wetting material.

The particular example of an actuator component 701 shown in FIGS. 19A and 19B further includes a membrane 720, provided at the top surface of the fluidic chamber substrate 702, and arranged to cover the fluidic chamber 710. The top surface of the fluidic chamber substrate 702 is taken to be the surface of the fluidic chamber substrate 702 opposite the bottom surface.

The membrane 720 is deformable to change the volume within the fluidic chamber 710, so as to generate pressure fluctuations in the fluidic chamber 710 such that droplet fluid may be ejected as a droplet from the fluidic chamber 710 via the nozzle 718.

The membrane 720 may comprise any suitable material, such as, for example a metal, an alloy, a dielectric material and/or a semiconductor material. Examples of suitable materials include silicon nitride ($Si_3N_4$), silicon dioxide ($SiO_2$), aluminium oxide ($Al_2O_3$), titanium dioxide ($TiO_2$), silicon (Si) or silicon carbide (SiC). The membrane 720 may additionally or alternatively comprise multiple layers.

The membrane 720 may be formed using any suitable processing technique, such as, for example, ALD, sputtering, electrochemical processes and/or a CVD technique. When the membrane 720 is provided on the top surface, apertures corresponding to the fluidic ports 713/716 may be provided in the membrane 720, e.g. using a suitable patterning technique for example during the formation of the membrane 720.

In the particular example of an actuator component 701 shown FIGS. 19A and 19B, each actuator element 722 is provided on the membrane 720 and is arranged to deform the membrane 720, such that the head operates in roof mode.

In more detail, the actuator element 722 is a piezoelectric element 724 provided with two electrodes 726 and 728. The piezoelectric element 724 may, for example, comprise lead zirconate titanate (PZT), however any suitable material may be used.

An electrode is provided in the form of a lower electrode 726 on the membrane 720. The piezoelectric element 724 is provided on the lower electrode 726 using any suitable deposition technique. For example, a sol-gel deposition technique may be used to deposit successive layers of piezoelectric material to form the piezoelectric element 724 on the lower electrode 726, or the piezoelectric element 724 may be formed using any suitable technique.

A further electrode in the form of an upper electrode 728 is provided on the piezoelectric element 724 at the opposite side of the piezoelectric element 724 to the lower electrode 726, however any suitable configuration of the electrodes could be used.

The electrodes 726/728 may comprise any suitable material e.g. iridium (Ir), ruthenium (Ru), platinum (Pt), nickel (Ni) iridium oxide ($Ir_2O_3$), $Ir_2O_3$/Ir and/or gold (Au). The electrodes 726/728 may be formed using any suitable technique, such as a sputtering technique.

The electrodes 726/728 and the piezoelectric element 724 may be patterned separately or in the same processing step to define the actuator element 722.

When a voltage differential is applied between the electrodes 726/728, a stress is generated in the piezoelectric element 724, causing the actuator element 722 to deform on the membrane 720. This deformation changes the volume within the fluidic chamber 710 and droplets may be discharged from the nozzle 718 by driving the piezoelectric actuator 722 with an appropriate signal. The signal may be supplied from a controller (not shown), for example as a voltage waveform. The controller may comprise a power amplifier or switching circuit connected to a computer running an application which generates signals in response to input data provided thereto e.g. uploaded thereto by a user.

Further material/layers (not shown) may also be provided in addition to the electrodes 726/728 and piezoelectric elements 724 as required.

A wiring layer comprising electrical connections is provided on the membrane 720, whereby the wiring layer may comprise two or more electrical traces for example, to connect the upper electrode 728 and/or lower electrode 726 of the actuator element 722 to the controller, directly or via further drive circuitry.

The electrical traces comprise a conductive material, e.g. copper (Cu), gold (Ag), platinum (Pt), iridium (Ir), aluminium (Al), titanium nitride (TiN). The electrical traces may, for example, have a thickness of between 0.01 µm to 2 µm, and, in some constructions, the thickness may be between 0.1 µm and 1 µm, and in further constructions the thickness may be between 0.3 µm and 0.7 µm.

The wiring layer may comprise further materials (not shown), for example, a passivation material to protect the electrical traces from the environment and from contacting the droplet fluid.

Additionally or alternatively, the passivation material may comprise a dielectric material provided to electrically insulate electrical traces from each other e.g. when stacked atop one another or provided adjacent each other.

The passivation material may comprise any suitable material, for example: $SiO_2$, $Al_2O_3$ or $Si_3N_4$.

The wiring layer may further comprise adhesion electrical traces, the passivation material, the electrodes 726/728 and/or the membrane 720.

The actuator component 701 may include further features not described herein. For example, a capping substrate (not shown) may be provided atop the fluidic chamber substrate 702, for example at the top surface, the membrane 720 and/or the wiring layer to cover the actuator element 722 and to further protect the actuator element 722. The capping substrate may further define fluidic channels for supplying droplet fluid to the fluidic inlet ports 713 e.g. from the lower manifold component 50 and for receiving droplet fluid from the fluidic outlet port 716.

While the actuator component 701 shown in FIGS. 19A and 19B includes an actuator element 722 provided on and arranged to deform the membrane 720, such that the head operates in roof mode, it is envisaged that any suitable type of actuator or electrode configuration capable of effecting droplet generation may be used. For instance, the may head may operate in a shared-wall configuration, whereby the actuator elements are configured as actuable walls formed of piezoelectric material that separate adjacent fluid chambers 710 within the array 750.

Thus, the construction shown in FIGS. 19A and 19B might be modified such that the partition walls 731 between successive chambers in the array 750 are formed of piezoelectric material and are configured as piezoelectric actuator elements. Electrodes can be provided on each such partition wall 731 and arranged with respect to the poling direction(s) of the piezoelectric material of the partition walls 731 such that each wall deforms in shear mode, or in direct mode. In addition, such electrodes may be arranged with respect to the poling direction(s) of the piezoelectric material of the partition walls 731 such that each of the walls deforms in chevron-mode when a drive waveform is applied, whereby top and bottom portions of each wall deform in opposite senses.

In constructions where the partition walls 731 are configured as piezoelectric actuator elements, the membrane 720 may be made thicker, or an alternative component might seal the tops of the chambers 710.

As mentioned above, the inventors consider that, to provide a head having velocity and volume response curves with trend lines roughly parallel to the frequency axis, an important factor is the design of the fluidic paths in the vicinity of each actuator element.

In general, creating a fluidic architecture with the desired jetting performance requires selection of the fluidic characteristics of the critical components. Each component in the fluidic architecture (e.g. in the example actuator component 701 shown in FIGS. 19A and 19B, the nozzle 718, fluidic channels 714A/714B, fluid chamber 710, membrane 720 actuator element 722, and fluidic ports 713/716) can be characterized by three fluidic properties: resistance, inertance, and compliance. The head can be viewed as a repeatedly driven, damped harmonic oscillator.

The inventors consider that the inclusion of a flow restrictor in the fluid supply connections to each fluid chamber, such as at the inlet to each chamber (and, optionally, the outlet to each chamber, where such is present), may assist in balancing the flow through the nozzle and the flow through the fluid supply connections to the chamber during actuation. In addition, the resistance controls the refilling of the chamber following actuation (that is, between successive actuations) and adjusts the amplitude of the residual oscillations in the chamber.

More particularly, the flow restrictors in the fluid supply connections to each fluid chamber are thought to assist in controlling the average meniscus location during multiple drop ejection cycles. Such control is an important factor in achieving droplet velocity and volume response curves having trend lines that are generally parallel to the frequency (x-) axis trend line. In more detail, at low frequencies (that is, below the initial peak in the frequency response curve, which corresponds to the frequency associated with the nozzle capillary refill forces), the pressure oscillations that create fluid movement in the device come to rest before the next ejection pulse is applied to the actuator element. In this case each drop ejection is from the same meniscus position and hence unaffected by previous ejections. The cessation of pressure oscillations in the device is due to damping of the fluid moving back and forth through components with resistance.

The flow restrictors in the fluid supply connections to the fluid chambers may contribute to such damping: they may affect the amount of fluid entering the pressure chamber after an ejection and therefore impact upon the time taken for the meniscus to come to rest.

While at lower frequencies there is generally time for the fluid ejected to be replenished, at higher frequencies, more complex behaviour is typically observed. It is thought that the dynamic inflow of fluid from the fluid supply connections to the chamber (e.g. fluidic ports 713/716 and fluidic channels 714A/714B in the example of FIGS. 19A and 19B) owing to the negative pressures in the pressure oscillations, has a significant impact upon the trend line of the frequency response curves at higher frequencies.

The inventors have determined that the flow restrictors in the fluid supply connections to the fluid chambers may be designed with suitable resistance and/or inertance so as to achieve a refill time and amplitude of residual oscillations that promotes trend lines that are generally parallel to the frequency (here x-) axis.

In more detail, as the ejection frequency increases, the refill is typically less complete and the meniscus position at the time of droplet ejection may tend to move more and more inwards inside the nozzle. This reduces the amount of fluid in the nozzle and hence the inertance associated with the nozzle also decreases. This is known to give rise to a larger drop speed but at the expense of a smaller drop volume, which may result in the trend line for velocity gradually increasing with frequency and the trend line for volume gradually decreasing with frequency. This condition, where the meniscus is inside the nozzle when the droplet is ejected, may be termed "nozzle underflow". A related condition, which may be termed "nozzle overflow", may also occur, particularly at higher drive voltages. In this case, at low frequencies, a droplet is ejected when the meniscus is forward (or outwards) of its average position within the nozzle, even to the degree of bulging outside beyond the nozzle exit. When this happens, the inertance associated with the nozzle increases, which may result in the velocity trend line decreasing with frequency. The trend line for volume, however, may increase or decrease with frequency.

The inventors consider that it is possible to reduce the impact of "nozzle underflow" and/or "nozzle overflow" by modifying the fluidic characteristics of the components of a head and, in particular, by modifying the ratio of the impedance of the flow restrictor to the impedance of the nozzle and/or by modifying the ratio of the inertance of the flow restrictor to the inertance of the nozzle.

More particularly, modelling carried out by the inventors suggests that, in some cases, the impact of "nozzle underflow" may be reduced by decreasing the ratio of the impedance of the flow restrictor to the impedance of the nozzle and/or by decreasing the ratio of the inertance of the flow restrictor to the inertance of the nozzle. These measures limit the tendency, when operating at increasing frequency, for the meniscus position to retract away from the low frequency position inside the nozzle.

Such modelling also suggests that, in some cases, the impact of "nozzle overflow" may be reduced by increasing the ratio of the impedance of the flow restrictor to the impedance of the nozzle and/or by increasing the ratio of the inertance of the flow restrictor to the inertance of the nozzle. These measures may increase the refill time and therefore lessen the tendency, when operating at increasing frequency, for the meniscus position to advance further towards the exit of the nozzle relative to the low frequency position.

Note that, in some arrangements, the source of the electromechanical actuation need not include a piezoelectric element. Hence, or otherwise, the actuator elements could be electrostatic elements.

Scope of the Disclosure

As will be appreciated from the discussion above, the approaches described in the foregoing disclosure are capable of application with a wide range of droplet deposition heads.

Thus, in one aspect, the foregoing disclosure describes a method of providing adjustment data for a droplet deposition head, or a data processing component therefor, the droplet deposition head comprising: a plurality of fluid chambers, each provided with a respective actuator element.

The method according to this aspect comprises the steps of: receiving test data, which has been collected: by operating the droplet deposition head or a test droplet deposition head having substantially the same construction as said droplet deposition head, using each of a set of test waveforms, at each of a plurality of test frequencies distributed over a test range; and by recording the volume and velocity of the thus-ejected droplets, these recorded values ($vol_r$, $vel_r$) being represented within the test data; wherein the set of test waveforms includes a basic drive waveform and a number of adjusted drive waveforms, each of which corresponds to the basic drive waveform with the same waveform parameter (e.g. a particular waveform parameter chosen prior to the testing) adjusted by a respective amount (for instance, the adjusted drive waveforms differ from the basic drive waveform only in terms of the amount of this adjustment), said waveform parameter being a continuous variable; for each of a plurality of adjustment frequencies distributed over at least a portion of said test range, determining a corresponding adjustment value, which corresponds to an amount of adjustment for said waveform parameter that, based on the test data, is expected to result in adjusted values for droplet volume and velocity of, respectively, $vol_a$ and $vel_a$, which are substantially equal to targeted values for droplet volume and velocity, $vol_T$ and $vel_T$; and outputting a set of adjustment data representing a plurality of adjustment values, and a plurality of associated adjustment frequencies, including said determined adjustment values and their associated adjustment frequencies.

The selection of a waveform parameter that is a continuous variable may enable adjustment to occur with sufficient precision to result in values for droplet volume and velocity that are substantially equal to the targeted values for droplet volume and velocity, $vol_T$ and $vel_T$.

In another aspect, the foregoing disclosure describes a droplet deposition apparatus comprising: a droplet deposition head having a plurality of fluid chambers, each being provided with a respective actuator element; and data storage having stored thereon a set of adjustment data, which represents a plurality of adjustment values and a plurality of adjustment frequencies, each adjustment value being associated with a respective one of said adjustment frequencies. The apparatus is configured to: receive input data and, using said input data, determine a subset of said actuator elements to be actuated with drive waveforms based on said basic drive waveform; and actuate each actuator element within said subset with a drive waveform that is based on a basic drive waveform with the same waveform parameter being adjusted by a corresponding one of the adjustment values represented by said set of adjustment data, said corresponding one of the adjustment values being determined based on it being associated with the current operating frequency of the actuator element in question, said waveform parameter being a continuous variable. The adjustment data enable the head to eject droplets at frequencies within an operating range for the head whose values for droplet volume and velocity are substantially equal to targeted values for droplet volume and velocity, $vol_T$ and $vel_T$.

Again, the selection of a waveform parameter that is a continuous variable may enable adjustment to occur with sufficient precision to result in values for droplet volume and velocity that are substantially equal to the targeted values for droplet volume and velocity, $vol_T$ and $vel_T$.

Each fluid chamber may be provided with a respective nozzle, with actuating element for the chamber in question being actuable to cause the ejection of fluid from the chamber through the corresponding one of the nozzles. In some examples, the plurality of chambers may be arranged in one or more rows.

To meet the material needs of diverse applications, a wide variety of alternative fluids may be deposited by droplet deposition heads as described herein. For instance, a droplet deposition head may eject droplets of ink that may travel to a sheet of paper or card, or to other receiving media, such as textile or foil or shaped articles (e.g. cans, bottles etc.), to form an image, as is the case in inkjet printing applications, where the droplet deposition head may be an inkjet printhead or, more particularly, a drop-on-demand inkjet printhead.

Alternatively, droplets of fluid may be used to build structures, for example electrically active fluids may be deposited onto receiving media such as a circuit board so as to enable prototyping of electrical devices.

In another example, polymer containing fluids or molten polymer may be deposited in successive layers so as to produce a prototype model of an object (as in 3D printing).

In still other applications, droplet deposition heads might be adapted to deposit droplets of solution containing biological or chemical material onto a receiving medium such as a microarray.

Droplet deposition heads suitable for such alternative fluids may be generally similar in construction to printheads, with some adaptations made to handle the specific fluid in question.

Droplet deposition heads as described in the present disclosure may be drop-on-demand droplet deposition heads. In such heads, the pattern of droplets ejected varies in dependence upon the input data provided to the head.

It should be noted that the foregoing description is intended to provide a number of non-limiting examples that assist the skilled reader's understanding of the present invention and that demonstrate how the present invention may be implemented. Other examples and variations are contemplated within the scope of the appended claims.

The invention claimed is:

1. A method of providing adjustment data for a droplet deposition head comprising a plurality of fluid chambers with respective actuator elements, the method comprising:
   collecting test data by:
      operating the droplet deposition head using a set of test waveforms at a plurality of test frequencies distributed over a test range, the set of test waveforms comprising a basic drive waveform and a number of adjusted drive waveforms, each adjusted drive waveform corresponding to the basic drive waveform with a waveform parameter adjusted by a respective amount, the waveform parameter being a continuous variable; and
      recording a recorded volume ($vol_r$) and a recorded velocity ($vel_r$) of droplets ejected by the droplet deposition head, each recorded value ($vol_r$, $vel_r$) being represented within the test data; and
   determining adjustment values for a plurality of adjustment frequencies distributed over at least a portion of the test range, each adjustment value corresponding to an amount of adjustment for the waveform parameter that, based on the test data, is configured to result in adjusted values for droplet volume ($vol_a$) and droplet velocity ($vel_a$) substantially equal to corresponding targeted values for droplet volume ($vol_T$) and droplet velocity ($vel_T$); and
   outputting a set of adjustment data representing:
      the adjustment values; and
      the plurality of adjustment frequencies associated with the adjustment values.

2. The method according to claim 1, wherein each adjustment value corresponds to an amount of adjustment for the waveform parameter that, based on the test data, is configured to result in the adjusted values for droplet volume ($vol_a$) and droplet velocity ($vel_a$) being within a 10% tolerance of the targeted values for the droplet volume ($vol_T$) and droplet velocity ($vel_T$), respectively.

3. The method according to claim 1, wherein
   the droplet deposition head is a test droplet deposition head; and
   the adjustment values are determined to minimize the difference between:
      a value of a function of both droplet volume (vol) and droplet velocity (vel), when calculated using the adjusted values droplet volume ($vol_a$) and droplet velocity ($vel_a$) for the corresponding adjustment frequency; and
      the value of the same function, when calculated using the droplet volume ($vol_T$) and droplet velocity ($vel_T$).

4. The method according to claim 3, wherein the function varies as a product of droplet volume (vol) and droplet velocity (vel).

5. The method according to claim 3, wherein the function varies as a product droplet volume (vol) and droplet velocity squared ($vel^2$).

6. The method according to claim 3, wherein the function comprises:
   a scaled velocity difference value (x) defined as [($vel_T$−vel)/vel*], where vel* is a characteristic velocity; and
   a scaled volume difference value (y) defined as [($vol_T$−vol)/vol*], where vol* is a characteristic volume;
   wherein
      characteristic velocity (vel*) is defined as ($vel_r$−$vel_T$) or ($vel_T$); and
      characteristic volume (vol*) is defined as ($vol_r$−$vol_T$) or ($vol_T$).

7. The method according to claim 6, wherein the function varies as (A|x|+|y|) or as ($Ax^2+y^2$), where A is a constant.

8. The method according to claim 3, wherein
   determining the plurality of adjustment values comprises determining, using the test data, sensitivities of droplet volume (vol) and droplet velocity (vel) to changes of the basic drive waveform; and
   the adjustment values are determined using the sensitivities.

9. The method according to claim 3, wherein
   determining the plurality of adjustment values comprises determining, using the test data, a sensitivity of the value of the function to changes of the basic drive waveform; and
   the adjustment values are determined using the sensitivity.

10. The method according to claim 1, wherein determining the plurality of adjustment values comprises, fitting the recorded volume ($vol_r$) and the recorded velocity ($vel_r$), corresponding to each of the test waveforms, to a fitted volume curve and a fitted velocity curve respectively.

11. The method according to claim 1, wherein outputting the set of adjustment data comprises storing the adjustment data on data storage.

12. The method according to claim 11, wherein
   the data storage is part of a data processing component configured to be connected to the droplet deposition head, and
   the droplet deposition head and the data processing component, when connected, are operable to:
      receive input data;
      determine, based on the input data, a subset of the actuator elements to be actuated; and
      actuate each actuator element within the subset with a drive waveform based on the basic drive waveform adjusted by a corresponding adjustment value, the corresponding adjustment value being determined based on a current operating frequency of each actuator element.

13. The method according to claim 11, wherein
   the data storage is part of a data processing component, which is configured to be connected to the droplet deposition head, and the data processing component is configured to:
receive input data;
determine, based on the input data, a subset of the actuator elements to be actuated with drive waveforms, each drive waveform being based on the basic drive waveform adjusted by actuation adjustment values;
determine the actuation adjustment values for each actuator element within the subset based on a current operating frequency of each actuator element; and
output to the droplet deposition head actuation data, the actuation data comprising the subset of actuator elements and the actuation adjustment values.

14. The method according to claim 13, wherein the actuation adjustment values comprises an additional adjustment amount determined by:
a time interval since a last ejection caused by a neighboring actuator element for each actuator element; or
ageing data for each actuator element.

15. A data processing component coupled to a droplet deposition head comprising a plurality of fluid chambers with respective actuator elements, the data processing component being configured to:
provide adjustment data for the droplet deposition head;
collecting test data by:
operating the droplet deposition head using a set of test waveforms at a plurality of test frequencies distributed over a test range, the set of test waveforms comprising a basic drive waveform and a number of adjusted drive waveforms, each adjusted drive waveform corresponding to the basic drive waveform with a waveform parameter adjusted by a respective amount, the waveform parameter being a continuous variable; and
recording a recorded volume ($vol_r$) and a recorded velocity ($vel_r$) of droplets ejected by the droplet deposition head, each recorded value ($vol_r$, $vel_r$) being represented within the test data;
determine adjustment values for a plurality of adjustment frequencies distributed over at least a portion of the test range, each adjustment value corresponding to an amount of adjustment for the waveform parameter that, based on the test data, is configured to result in adjusted values for droplet volume ($vol_a$) and velocity ($vel_a$) substantially equal to corresponding targeted values for droplet volume ($vol_T$) and velocity($vel_T$); and
output a set of adjustment data representing:
the adjustment values, and
the plurality of adjustment frequencies associated with the adjustment values.

16. A droplet deposition apparatus comprising:
a droplet deposition head having a plurality of fluid chambers, each comprising a respective actuator element; and
data storage storing a set of adjustment data, which represents a plurality of adjustment values and a plurality of adjustment frequencies, each adjustment value being associated with a respective one of the adjustment frequencies; and
the apparatus being configured to:
receive input data;
determine, based on the input data, a subset of the actuator elements to be actuated; and
actuate each actuator element within the subset with a drive waveform that is based on a basic drive waveform adjusted by a corresponding one of adjustment values, the corresponding adjustment value being determined based on an operating frequency of each actuator element;
wherein the set of adjustment data enable the droplet deposition head to eject droplets at frequencies within an operating range having droplet volume (vol) and droplet velocity (vel) that are substantially equal to targeted values for droplet volume ($vol_T$) and velocity($vel_T$).

17. The droplet deposition apparatus of claim 16, wherein the set of adjustment data enable the droplet deposition head to eject droplets at frequencies within an operating range with droplet volume (vol) and droplet velocity (vel) within a 10% tolerance band of the targeted values for droplet volume ($vol_T$) and velocity $vel_T$).

18. The droplet deposition apparatus of claim 16, wherein
the data storage additionally stores a plurality of sets of adjustment data, each set of adjustment data corresponding to a waveform from a set of basic drive waveforms, the set of basic drive waveforms including the basic drive waveform,
each waveform from the set of basic drive waveforms causing the ejection of sub-droplets of fluid when applied to one of the actuator elements,
each set of adjustment data representing a plurality of adjustment values and corresponding adjustment frequencies, the plurality of sets of adjustment data including the set of adjustment data; and
the droplet deposition apparatus is further configured to:
determine, based on the input data, one or more subsets of the actuator elements; and
actuate each actuator element within the one or more subsets with a drive waveform that is based on a corresponding waveform from the set of basic drive waveforms, the corresponding waveform being adjusted by a corresponding adjustment value defined in one set of adjustment data, the adjustment values being determined based an operating frequency of each actuator element.

19. The droplet deposition apparatus of claim 18, wherein the droplet deposition head is configured to:
receive the actuation data;
identify the subset of actuator elements using actuation data;
actuate each actuator element within the subset with a drive waveform that is based on a corresponding waveform from the set of basic drive waveforms adjusted by corresponding adjustment values defined in the actuation data.

20. The droplet deposition apparatus of claim 16, further comprising a data processing component, which provides the data storage and is configured to be connected to the droplet deposition head, wherein the data processing component is configured to:
receive the input data;
determine, based on the input data, the subset of the actuator elements;
determine actuation adjustment values for each of the actuator elements within the subset of actuator elements;
output to the droplet deposition head actuation data, which comprises the subset of actuator elements and the actuation adjustment values.

21. The droplet deposition apparatus of claim 16, wherein, when one of the actuator elements is actuated with the basic drive waveform at a plurality of frequencies distributed over the operating range, the corresponding values for droplet volume and droplet velocity of ejected droplets at the plurality of frequencies define a volume frequency response curve and a velocity frequency response curve respectively;

minima values of the volume frequency response curve and the velocity frequency response curve are less than, or equal to, a higher end of a test range comprising a plurality of test frequencies; and maxima values of the volume frequency response curve and the velocity frequency response curve are greater than, or equal to, a lower end of the test range.

22. The droplet deposition apparatus of claim 16, wherein, when one of the actuator elements is actuated with the basic drive waveform at a plurality of frequencies distributed over the operating range, the corresponding values for droplet volume and droplet velocity of ejected droplets at the plurality of frequencies define a volume frequency response curve and a velocity frequency response curve respectively; and over substantially the whole operating range, the volume frequency response curve and the velocity frequency response curve oscillate around the lower end of a test range, comprising a plurality of test frequencies, for volume and velocity respectively.

* * * * *